(12) United States Patent
Percebon et al.

(10) Patent No.: US 10,984,946 B2
(45) Date of Patent: Apr. 20, 2021

(54) REDUCING MAGNETIC FLUX DENSITY PROXIMATE TO A WIRELESS CHARGING PAD

(71) Applicant: WiTricity Corporation, Watertown, MA (US)

(72) Inventors: Leandro Percebon, Munich (DE); Daniel Kuerschner, Grasbrunn (DE); Mickel Bipin Budhia, Auckland (NZ)

(73) Assignee: WiTricity Corporation, Watertown, MA (US)

( * ) Notice: Subject to any disclaimer, the term of this patent is extended or adjusted under 35 U.S.C. 154(b) by 161 days.

(21) Appl. No.: 15/700,024

(22) Filed: Sep. 8, 2017

(65) Prior Publication Data
US 2018/0174745 A1    Jun. 21, 2018

Related U.S. Application Data

(60) Provisional application No. 62/436,944, filed on Dec. 20, 2016.

(51) Int. Cl.
*H01F 38/14*    (2006.01)
*H02J 7/02*    (2016.01)
(Continued)

(52) U.S. Cl.
CPC ............... *H01F 38/14* (2013.01); *H01F 3/10* (2013.01); *H01F 27/28* (2013.01); *H01F 27/36* (2013.01);
(Continued)

(58) Field of Classification Search
CPC .......... H01F 38/14; H01F 27/365; H01F 3/10; H01F 27/28; H01F 41/04; H02J 50/10; H02J 50/70; H02J 50/12; H02J 7/025
See application file for complete search history.

(56) References Cited

U.S. PATENT DOCUMENTS

| 10,819,156 B2 | 10/2020 | Zaheer et al. |
| 2008/0116847 A1 | 5/2008 | Loke et al. |

(Continued)

FOREIGN PATENT DOCUMENTS

| DE | 102006025460 A1 | 12/2007 |
| GB | 2512862 A | 10/2014 |

(Continued)

OTHER PUBLICATIONS

International Search Report and Written Opinion—PCT/US2017/064287—ISA/EPO—dated Mar. 26, 2018.

(Continued)

*Primary Examiner* — Drew A Dunn
*Assistant Examiner* — Sailesh Thapa
(74) *Attorney, Agent, or Firm* — Colby Nipper PLLC

(57) ABSTRACT

Systems and methods are described that reduce magnetic flux density proximate to a wireless charging pad, such as a WEVC pad. These systems and methods control peak magnetic flux density in air around a WEVC pad to reduce potentially dangerous heat produced in foreign metal objects affected by a magnetic field generated by a coil of the WEVC pad. Controlling the peak magnetic flux density results in a safer WEVC pad. Aspects include ferrite tiles being separated by gaps having predefined sizes to increase a magnetic reluctance of a path of the magnetic flux through the ferrite tiles, which reduces a peak magnetic flux density experienced in areas proximate to the coil. In addition, the ferrite tiles can be arranged such that a combination of gaps are aligned with a region overlapping the coil.

30 Claims, 13 Drawing Sheets

(51) Int. Cl.
*H01F 41/04* (2006.01)
*H01F 27/28* (2006.01)
*H02J 50/12* (2016.01)
*H01F 27/36* (2006.01)
*H01F 3/10* (2006.01)
*H02J 50/10* (2016.01)
*H02J 50/70* (2016.01)

(52) U.S. Cl.
CPC .............. *H01F 41/04* (2013.01); *H02J 7/025* (2013.01); *H02J 50/10* (2016.02); *H02J 50/12* (2016.02); *H02J 50/70* (2016.02)

(56) References Cited

U.S. PATENT DOCUMENTS

| | | | |
|---|---|---|---|
| 2010/0308939 A1 | 12/2010 | Kurs | |
| 2013/0249303 A1* | 9/2013 | Keeling | H02J 7/025 307/104 |
| 2013/0314200 A1 | 11/2013 | Jitaru et al. | |
| 2014/0049212 A1* | 2/2014 | Sawa | H01F 38/14 320/108 |
| 2014/0361627 A1 | 12/2014 | Kurs et al. | |
| 2015/0077053 A1 | 3/2015 | Stamenic et al. | |
| 2015/0162753 A1 | 6/2015 | Werner et al. | |
| 2015/0236513 A1* | 8/2015 | Covic | H02J 7/025 307/104 |
| 2016/0012967 A1 | 1/2016 | Kurs et al. | |
| 2016/0013661 A1* | 1/2016 | Kurs | B60L 53/36 307/104 |
| 2016/0072304 A1* | 3/2016 | Anders | H01F 27/365 307/104 |
| 2016/0233723 A1 | 8/2016 | Lestoquoy et al. | |
| 2017/0033606 A1* | 2/2017 | Maikawa | H02J 50/70 |
| 2017/0040098 A1* | 2/2017 | Yuasa | H01F 3/10 |
| 2018/0287411 A1 | 10/2018 | Lee et al. | |
| 2019/0173317 A1 | 6/2019 | Zaheer et al. | |

FOREIGN PATENT DOCUMENTS

| | | |
|---|---|---|
| WO | 9831073 A2 | 7/1998 |
| WO | 2015155835 A1 | 10/2015 |
| WO | 2016007594 A1 | 1/2016 |

OTHER PUBLICATIONS

"International Preliminary Report on Patentability", PCT Application No. PCT/US2017/064287, dated Jul. 4, 2019, 10 pages.

"Restriction Requirement", U.S. Appl. No. 16/178,559, 5 Pages.

"Ex Parte Quayle Action", U.S. Appl. No. 16/178,559, Jun. 4, 2020, 4 Pages.

"Notice of Allowance", U.S. Appl. No. 16/178,559, dated Jul. 1, 2020, 5 Pages.

* cited by examiner

REDUCING MAGNETIC FLUX DENSITY PROXIMATE TO A WIRELESS CHARGING PAD

RELATED APPLICATIONS

This application claims the benefit of and priority to U.S. Provisional Appl. Ser. No. 62/436,944, filed on Dec. 20, 2016, the disclosure of which is incorporated herein by reference in its entirety.

FIELD

The present disclosure relates generally to wireless power transfer, and more specifically to wireless electric vehicle charging (WEVC) systems.

BACKGROUND

Wireless power transfer is the transmission of electrical energy from a power source to an electrical load without the use of conductors, such as interconnecting wires. Wireless power is a generic term that refers to a number of different power transmission technologies that use time-varying electric, magnetic, or electromagnetic fields. In wireless power transfer, a wireless transmitter connected to a power source transmits field energy across an intervening space to one or more receivers, where it is converted back to an electrical current and then used. Wireless transmission is useful to power electrical devices in cases where interconnecting wires are inconvenient, hazardous, or are not possible. However, current wireless power transfer systems suffer from inefficiencies related to controlling magnetic flux.

SUMMARY

Systems and methods are described to reduce magnetic flux density in air around a power-transfer structure, such as a wireless electric vehicle charging (WEVC) pad. In particular, the techniques described in this document reduce the flux density that is generated directly above a primary coil or directly below a secondary coil of the wireless charging pad. Reducing the flux density reduces heat produced in foreign metal objects that are affected by the magnetic field generated by the coils. This includes foreign metal objects that are not detected by a foreign object detection (FOD) system but which, when exposed to magnetic fields, can generate heat at dangerous levels. Therefore, reducing the flux density makes the wireless charging pad safer.

Aspects include mechanical gaps located between ferrite tiles of the pad. These gaps increase a magnetic reluctance of a flux path of the magnetic field through the ferrite tiles, which reduces a peak magnetic flux density experienced in areas (e.g., air) proximate to the coils, such as in areas that are within a range of the magnetic field.

In an example aspect, a wireless charging apparatus is disclosed. The wireless charging apparatus includes a coil and a plurality of ferrite tiles. The coil is configured to generate a magnetic field, and the coil has a shape. The plurality of ferrite tiles includes at least a first pair of tiles and a second pair of tiles each located proximate to the coil. The plurality of ferrite tiles is configured to provide a path for magnetic flux of the magnetic field. The first pair of tiles is separated by a first gap having a predefined size to increase a magnetic reluctance of the path of the magnetic flux through the first pair of tiles. The second pair of tiles is separated by a second gap having a predefined size to increase a magnetic reluctance of the path of the magnetic flux through the second pair of tiles. The first gap is aligned with the second gap to create a combination of gaps aligned with a region overlapping the coil. The combination of gaps is configured to reduce a peak magnetic flux density in proximity to the coils.

In an example aspect, a wireless charging system is disclosed. The wireless charging system includes a coil and a ferromagnetic layer. The coil is configured to generate a magnetic field based on an electrical current running through the coil. In addition, the coil has an inner edge, an outer edge, and a midline centered between the inner edge and the outer edge. The ferromagnetic layer is configured to provide a path for magnetic flux of the magnetic field. The ferromagnetic layer includes a non-ferromagnetic portion disposed at a location within the ferromagnetic layer that is between the midline and the inner edge of the coil. The non-ferromagnetic portion is configured to increase a magnetic reluctance of the path of the magnetic flux through the ferromagnetic layer and reduce a peak magnetic flux density in proximity to the coil.

In an example aspect, a method for controlling a peak magnetic flux density proximate to a coil of a wireless charging system is disclosed. The method includes determining respective locations within a ferrite layer of the wireless charging system for a gap to be included between respective pairs of ferrite tiles of the ferrite layer. A combination of gaps are aligned with a region that overlaps the coil between an inner edge of the coil and a midline of the coil. The method also includes determining a size of each gap to increase a magnetic reluctance of a flux path in the ferrite layer. The method further includes forming the ferrite layer by arranging the ferrite tiles to cause each gap to have the determined location and the determined size to control the peak magnetic flux density proximate to the coil.

In an example aspect, a wireless power-transfer apparatus is disclosed. The wireless power-transfer apparatus includes a coil configured to generate a magnetic field based on an electrical current running through the coil. The coil includes an inner edge, an outer edge, and a midline centered between the inner edge and the outer edge. The wireless power-transfer apparatus further includes a channeling means for channeling magnetic flux induced by the magnetic field and controlling a peak magnetic flux density proximate to the coil based on an increased reluctance of a path of the magnetic flux through the channeling means at a predetermined location overlapping the coil. The predetermined location of the increased reluctance approximates a portion of a smaller version of a shape of the coil between the inner edge and the midline of the coil.

DETAILED DESCRIPTION

Wirelessly transferring power involves transferring energy through electric fields, magnetic fields, electromagnetic fields, or otherwise from a transmitter to a receiver without the use of physical electrical conductors (e.g., power may be transferred through free space). The power output into a wireless field (e.g., a magnetic field) may be transmitted, received, captured, or coupled by a "power transfer element" to achieve power transfer.

Magnetic flux densities above a WEVC primary coil and below a WEVC secondary coil can be substantially high. For this reason, foreign object detection (FOD) may be implemented to detect foreign metal objects that are affected by a magnetic field generated by the coils. FOD systems, however, may fail to detect all foreign objects affected by the magnetic field, which raises safety concerns. For example, a foreign metal object affected by a high flux density zone of the magnetic field can increase in temperature.

Figure 1:
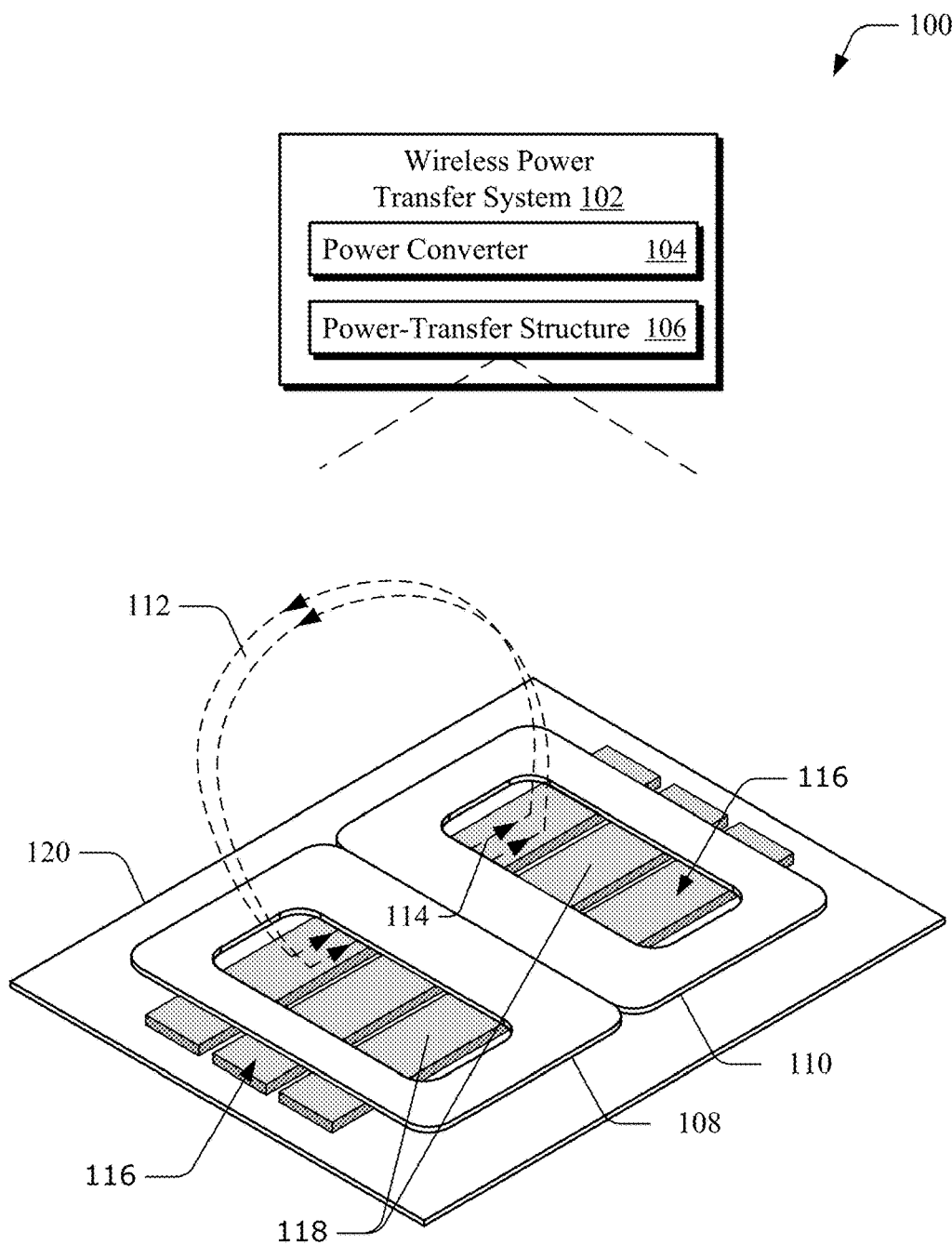
FIG. 1 illustrates an example implementation of a wireless power transfer system.

FIG. 1 illustrates an example implementation 100 of a wireless power transfer system 102. The wireless power transfer system 102 transfers energy from a power source to a remote system. The wireless power transfer system 102 includes a power converter 104 and a power-transfer structure 106. The power converter 104 converts power from a power source to a suitable operating frequency for wireless high-power transfer via the power-transfer structure 106, or the power converter 104 converts power received via the power-transfer structure 106 into a suitable voltage level of a load, such as a battery.

The power-transfer structure 106 (also referred to herein as a "pad") wirelessly transmits or receives power. In the illustrated example, the power-transfer structure 106 includes a double-D (DD) topology, which includes two electrically conductive coils 108, 110 disposed proximate to one another. In one example, the coil 108 is adjacent and co-planar with the coil 110. The coils 108, 110 are configured to generate a magnetic field 112 by running current through the coils 108, 110. Generally, the current in the center of the pad runs in the same direction. For example, the current in the coil 108 may run in a clockwise direction while the current in the coil 110 may run in a counterclockwise direction. In this way, a high magnetic field strength is generated in the center of the pad (e.g., may arch in a horizontal direction between the poles/openings above the pad). While the power-transfer structure 106 is shown as including separate coils, DD coil topologies can include two separate conductors or a single conductor wound to form a DD coil topology (e.g., as described with respect to FIG. 8), and multiple turns are contemplated in various applications. Other coil topologies are also applicable to the techniques described herein, including a multi-coil topology (e.g., Bi-Polar, Double-D plus quadrature (DDQ)) or a single coil topology (e.g., circular coil).

In the illustrated example, magnetic flux 114 induced by the magnetic field 112 passes through ferrite 116 disposed proximate to the coils. Here, the ferrite 116 is substantially orthogonal to the coils 108, 110 in the center of the pad, resulting in the flux 114 passing in a straight line through the length of the pad. In an ideal case, a monolithic ferrite slab (in which 100% of the volume is used for ferrite) would be used. However, it may not be practical to make or use such slabs in large sizes using current manufacturing techniques or due to cost. For example, ferrite is generally produced using a process that involves sintering, which compacts and forms a solid mass of material by heat or pressure without melting it to the point of liquefaction. Through the sintering process the ferrite can shrink unevenly, resulting in poor manufacturing tolerances. Further, ferrite is a brittle ceramic material, which is susceptible to cracking when exposed to bending stresses, such as those caused by vibration. These cracks can substantially change the flux paths through the ferrite, resulting in nondeterministic behaviors for the pad. For ferrite in a vehicle, for example, the ferrite can crack in random locations which can result in poor performance and/or overheating and insulation damage.

Although monolithic ferrite slabs are ideal, they may not be practical. Because of these concerns, the ferrite 116 can be formed in pieces that are tightly packed together into bars or tiles, and arranged in rows, e.g., strips 118. The strips 118 each include a subset of ferrite tiles positioned along a longitudinal axis that is substantially parallel to the magnetic field generated by the coils 108, 110 to channel the flux as flux lines that pass straight through the strips 118.

In addition, in the context of a vehicle pad, for example, it is desirable to make the pad as thin as possible, e.g., less than 15 mm thick, while still protecting the brittle ferrite strips 118 from cracking or breaking. To provide some structural support, the strips 118 are mounted to a backplate 120.

Figure 2:
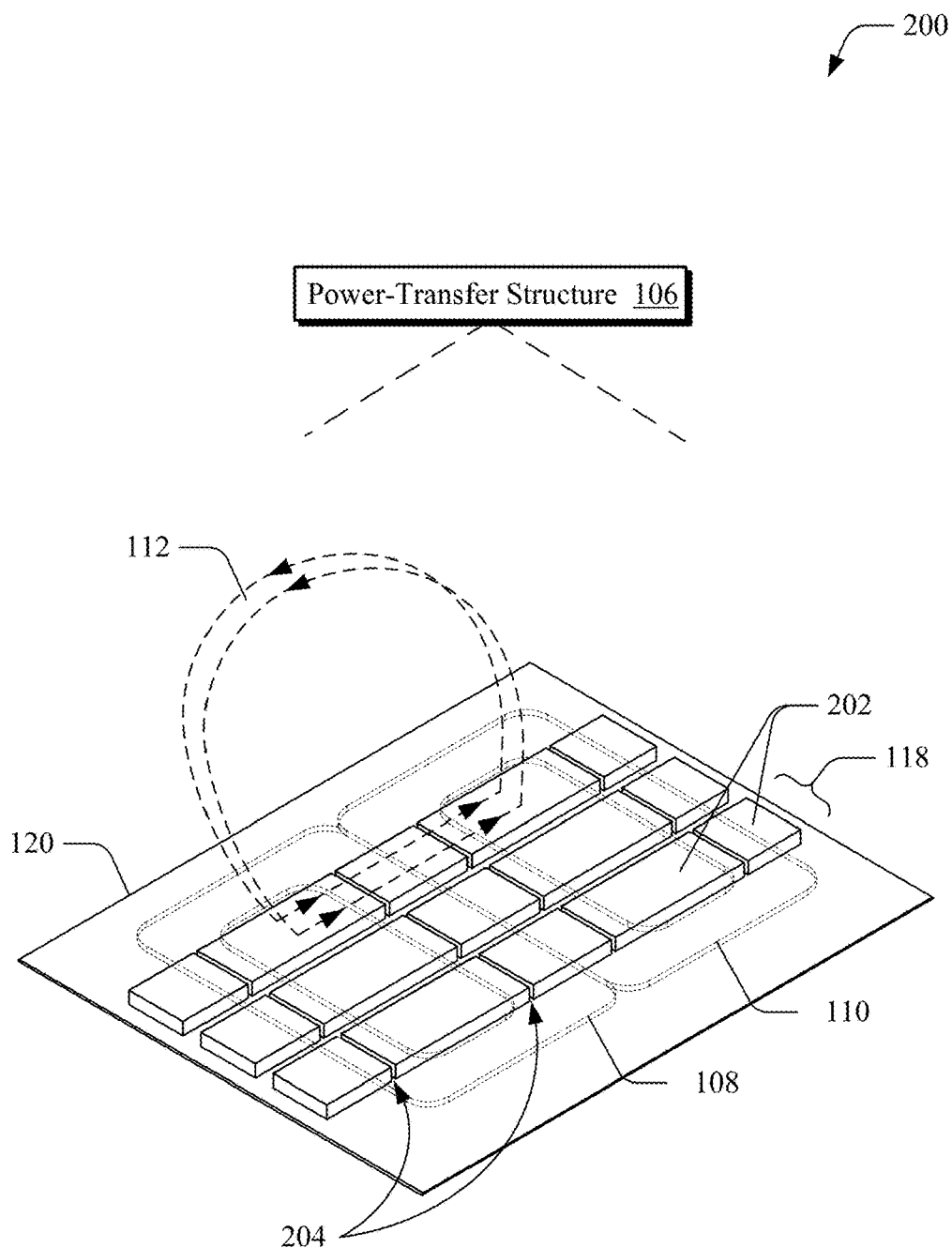
FIG. 2 illustrates an example implementation of a power-transfer structure from FIG. 1 in more detail.

FIG. 2 illustrates an example implementation of the power-transfer structure 106 from FIG. 1 in more detail. Here, the power-transfer structure 106 (e.g., a DD pad) includes the strips 118, which are formed from ferrite tiles 202 arranged in rows. At least some of the strips 118 include an intentional gap 204 in the strip 118. The intentional gaps 204 in the strips 118 are each relatively larger than any type of gaps or spaces due to manufacturing tolerances and material flaws associated with the strips 118.

The gap 204 is substantially perpendicular to a longitudinal axis of the strip 118, such that the gap 204 is substantially perpendicular to the magnetic field 112. In example aspects, the gap 204 is filled with a non-ferromagnetic material, such as gas (e.g., air), copper, aluminum, magnesium, and so on. The non-ferromagnetic material is used to increase reluctance along the strip 118. Further discussion of these and other aspects is included in more detail below.

Figure 3:
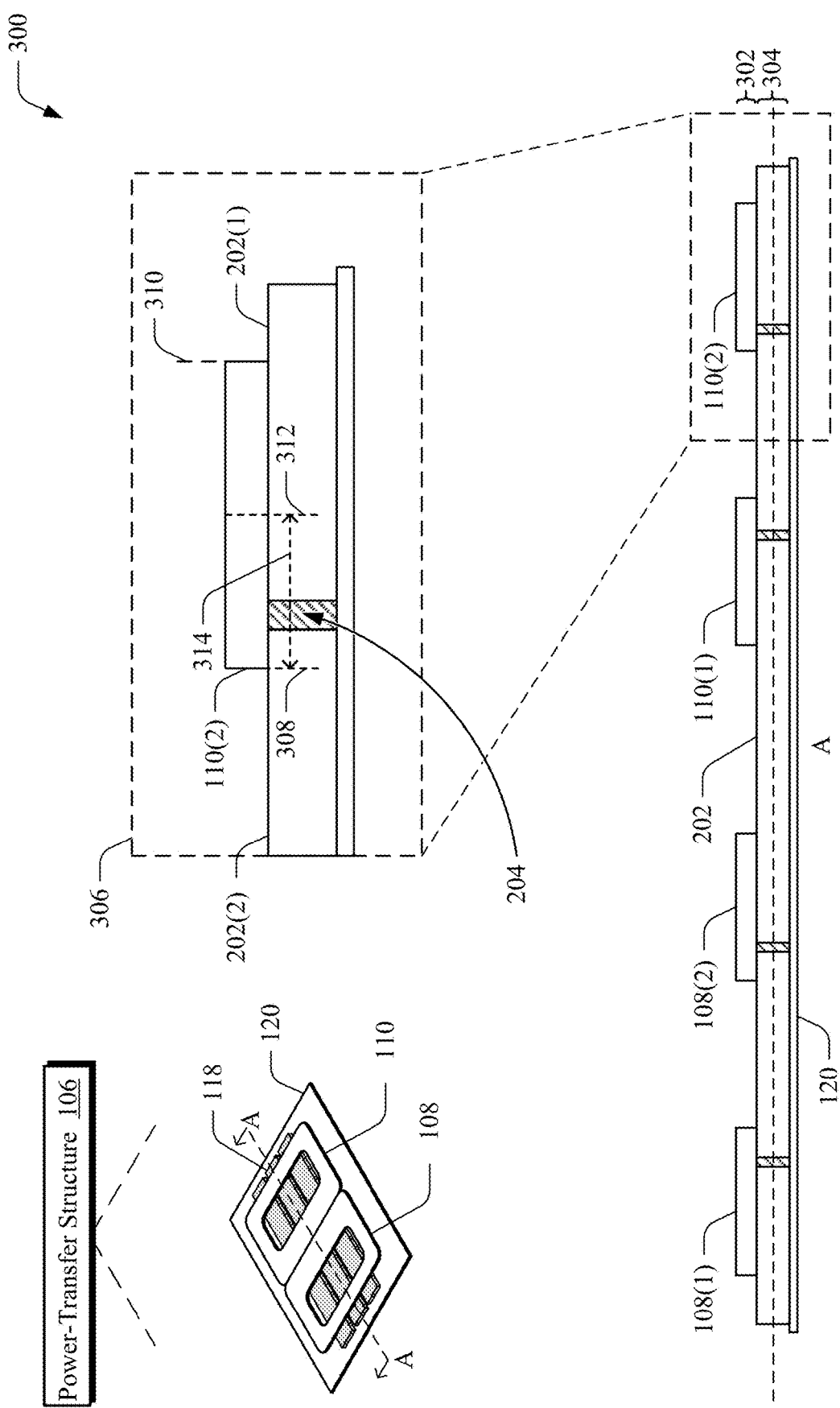
FIG. 3 illustrates a cross-section view of an example implementation of the power-transfer structure from FIG. 1.

FIG. 3 illustrates a cross-section view "A" of an example implementation 300 of the power-transfer structure 106 from FIG. 1. For example, the cross-section view "A"

illustrates a coil layer 302 having portions of the coils 108, 110, such as portion 108(1) and portion 108(2) of the coil 108 and portion 110(1) and portion 110(2) of the coil 110. In addition, a ferromagnetic layer 304 including the ferrite tiles 202 is disposed proximate to the coil layer 302. Any suitable number of ferrite tiles 202 can be utilized in the ferromagnetic layer 304 and/or in each strip 118. In the illustrated example, five ferrite tiles 202 are shown.

In addition, FIG. 3 includes an expanded view 306 of a portion of the cross-section view "A". The portion 110(2) of the coil 110 is shown with an inner edge 308, an outer edge 310, and a midline 312 centered between the inner edge 308 and the outer edge 310. As described above, the ferrite tiles 202 are arranged such that gaps 204 are formed between pairs of the ferrite tiles 202 in a strip 118. For example, tile 202(1) and tile 202(2) are positioned relative to each other to form the gap 204 between them. In example aspects, the tiles 202(1), 202(2) can be arranged to cause the gap 204 to be located under the portion 110(2) of the coil 110. Alternatively, the gap 204 can be located in an area that is not directly under the portion 110(2) of the coil 110. In at least some aspects, the tiles 202(1), 202(2) can be arranged to cause the gap 204 to be located in a region 314 that is between the inner edge 308 and the midline 312 of the portion 110(2) of the coil 110.

In addition, the gap 204 can be any suitable size. In some aspects, the ferrite tiles 202 are arranged such that the size of the gap 204 is in a range of about one quarter (0.25) millimeter (mm) to one (1) centimeter, or within a range of about 0.25-2.0 mm, 2.0-5.0 mm, 5.0-7.0 mm, or 7.0 mm-1.0 cm. The size and location of the gap 204 can affect the peak magnetic flux density above the coil 110. The size of the gap 204 directly affects reluctance of magnetic flux across the gap 204 because non-ferromagnetic materials are more resistive to magnetic flux passing through them. For example, it is approximately 2000 times easier for flux to pass through ferrite than through air. The location of the gap 204 (e.g., location of increased magnetic reluctance) can reduce the flux density on an opposite side of the coil 110 from the gap 204. If, for instance, the gap 204 is aligned with peak flux density above the coil 110, then the peak flux density can be reduced. Accordingly, this arrangement of the ferrite tiles 202 results in an increased magnetic reluctance of the magnetic flux along the ferromagnetic layer 304 and also a decreased peak flux density above the coil 110, such as in the air on an opposing side of the coil 110 from the ferromagnetic layer 304. Generally, the peak magnetic flux proximate to the coils occurs at the surface of the coils (e.g., within 0.01 millimeters). However, the peak magnetic flux can occur anywhere within the magnetic field, such as the magnetic field 112 of FIG. 2.

Figure 4:
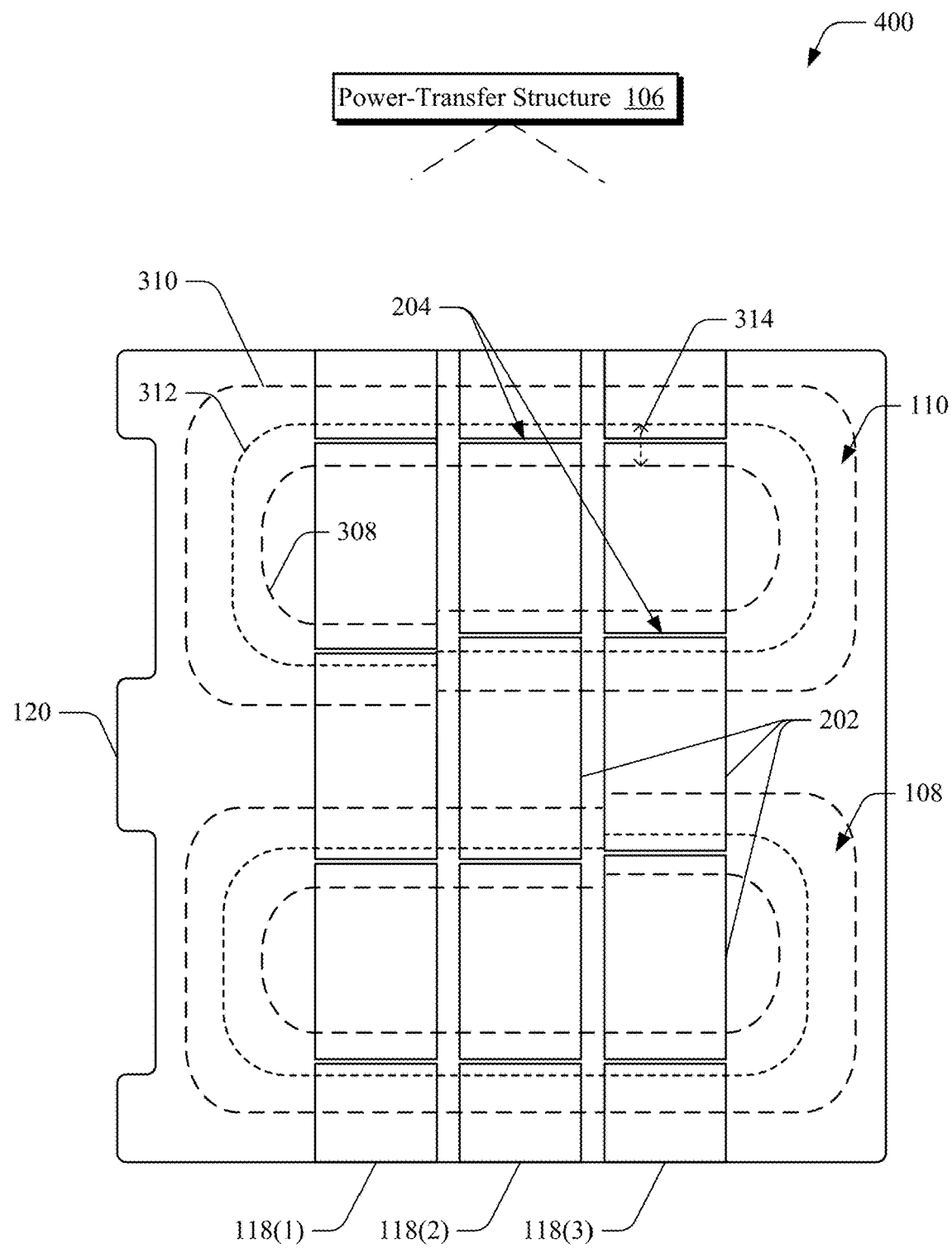
FIG. 4 illustrates a plan view of an example implementation of a structure for reducing magnetic flux density proximate to a power-transfer structure.

FIG. 4 illustrates a plan view of an example implementation 400 of the power-transfer structure 106 from FIG. 1. For example, the power-transfer structure 106 is illustrated as a DD pad with three example ferrite strips 118(1)-(3) positioned lengthwise across two coils (e.g., coils 108, 110). The coils 108, 110 are illustrated with dashed lines representing the inner edge 308 and the outer edge 310 and with a dotted line representing the midline 312. In the illustrated example, the tiles 202 are arranged to create a gap 204 between each pair of tiles 202 in a strip 118. The tiles 202 are positioned such that a combination of the gaps 204 are aligned with a region overlapping the coil. In an example, the gaps 204 correspond to locations that approximate the portion of a smaller version of a shape of the coil. The gaps 204 jointly approximate a shape that resembles a smaller version of the coil, and each gap 204 follows a portion of that shape. For example, each gap 204 in FIG. 4 corresponds to a relative direction of the coil at the corresponding location of the gap 204. Here, the gaps 204 are substantially parallel with a portion of the coil under which the gap 204 is located. In example aspects, the gap 204 is substantially orthogonal to the direction of the magnetic field, which is orthogonal to the direction of windings in the coils. In addition, and as described above, the gaps 204 can be located within the region 314 that is between the inner edge 308 and the midline 312 of a given coil, e.g., the coils 108, 110, which generally corresponds with a location of the peak flux density in air proximate to the coil. Aligning the gap 204 with an approximate location of peak flux density in proximity to the coil, such as in air around the coil, can reduce the peak flux density based on the increased magnetic reluctance of the magnetic flux across the gap 204.

Figure 5:
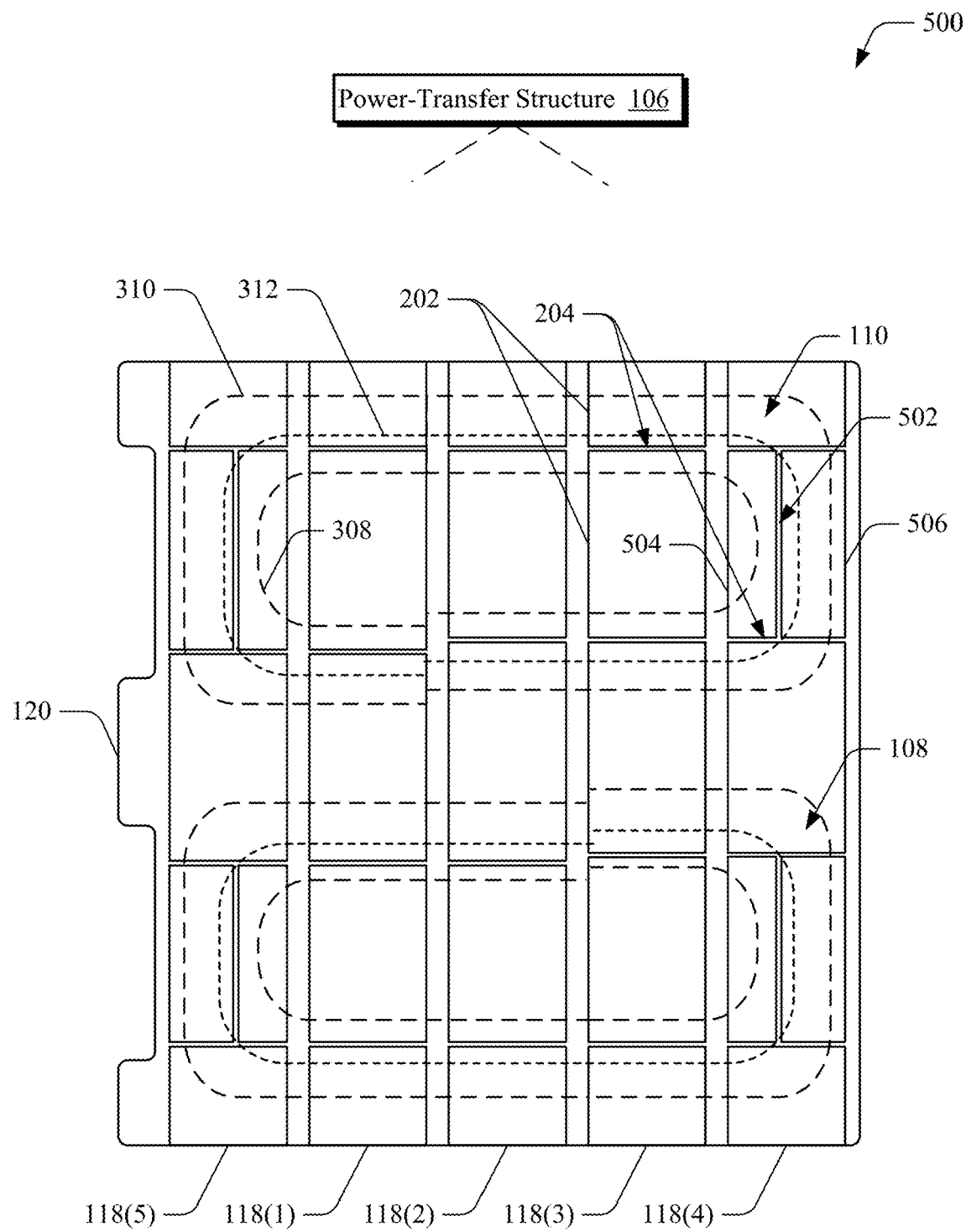
FIG. 5 illustrates a plan view of an example implementation of a structure for reducing magnetic flux density proximate to a power-transfer structure.

FIG. 5 illustrates a plan view of an example implementation 500 of the power-transfer structure 106 from FIG. 1. For example, the power-transfer structure 106 is illustrated as a DD pad with five example ferrite strips, e.g., three inner strips 118(1)-(3) and two outer strips 118(4), 118(5). As above, the ferrite tiles 202 can be separated from one another to create gaps 204 between pairs or sets of tiles 202 in a strip 118, such that a combination of the gaps are aligned with a region that overlaps the coil. In an example, the combination of gaps correspond to a smaller version of the shape of the coil. In FIG. 5, the outer strip 118(4) includes a gap 502 that is substantially parallel to the outer strip 118(4). The gap 502 is created between tile 504 and tile 506. The gap 502 runs in a direction that is different from other gaps 204 in the strip 118(4) or in the inner strips 118(1)-(3) due to the shape of the coil 110. For example, around the outer curve of the coil 110, the shape of the coil 110 includes a portion that is substantially parallel to a longitudinal axis of the strip 118(4). Along the outer curve of the coil 110, the gap 502 is therefore substantially orthogonal to the direction of the magnetic field 112 (not shown). In addition, a similar gap can be created in the outer strip 118(4) to correspond to the outer curve of the coil 108. In other aspects, similar gaps can also be created in the outer strip 118(5) to correspond to the outer curve of each coil 108, 110. Although FIG. 5 is illustrated with the gap 502 being substantially parallel to the strip 118(4), other shapes of the gap 502 are also contemplated, and are described in further detail in relation to FIG. 6.

Figure 6:
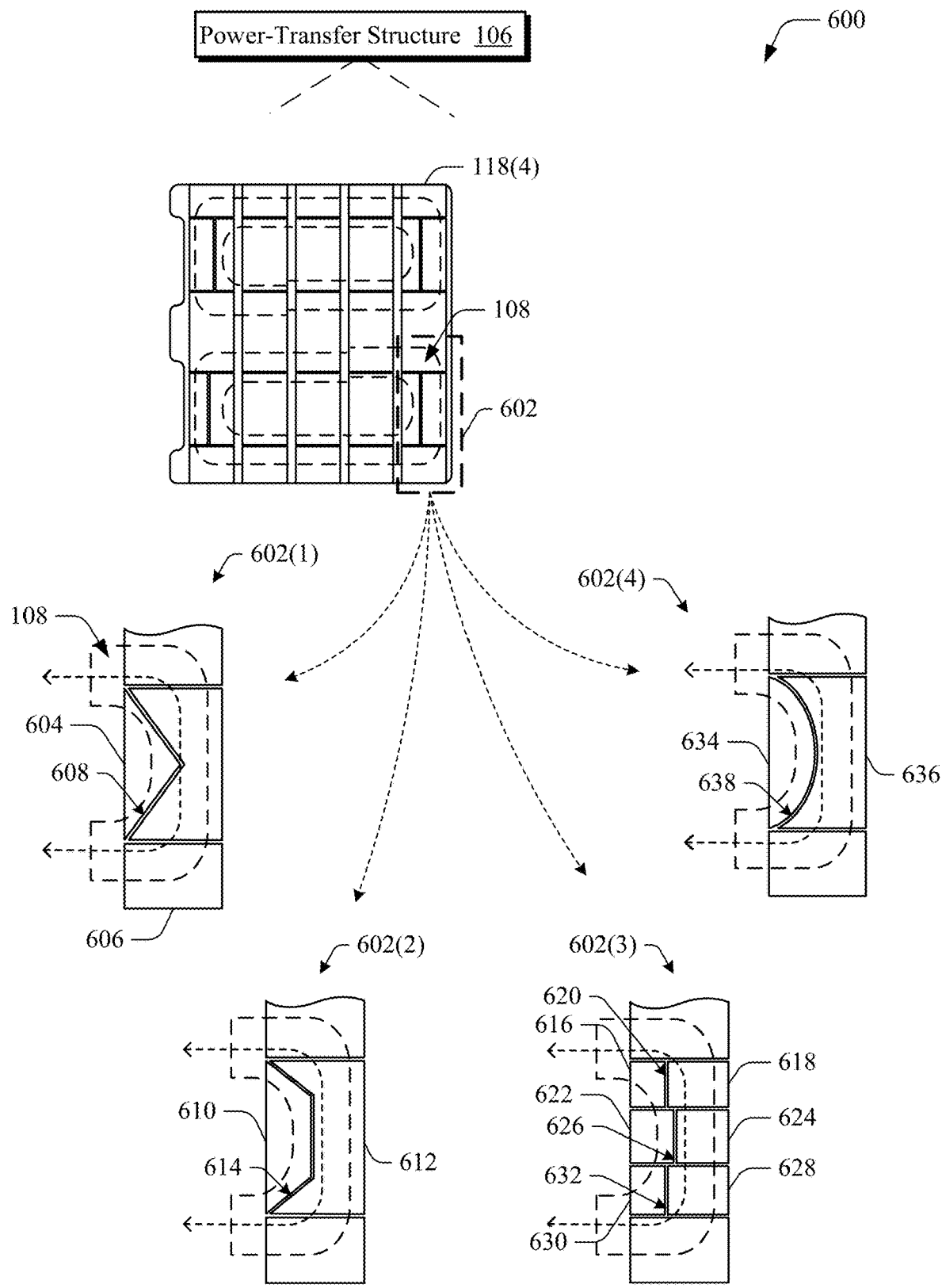
FIG. 6 illustrates an example implementation of alternative tile arrangements for an outer strip of the power-transfer structure from FIG. 5.

FIG. 6 illustrates an example implementation 600 of alternative tile arrangements for the outer strip 118(4) of the power-transfer structure 106 from FIG. 5. For example, ferrite tiles positioned along the outer curve of the coil 108 can be arranged in a variety of different ways to cause the gaps between the ferrite tiles to approximate a smaller version of the shape or curvature of the coil 108.

Scenario 602(1), for example, includes a triangular shaped tile 604 positioned proximate to another tile 606 such that a gap 608 is formed between the tiles 604 and 606, where the gap 608 is angled along the outer curve of the coil 108. Scenario 602(2) includes a trapezoidal-shaped tile 610 and another tile 612 forming a gap 614 that more substantially approximates the shape of the outer curve of the coil 108 in comparison to the scenario 602(1). Here, the gap 614 is segmented with neighboring segments forming an angle between 90 degrees and 180 degrees to approximate the curvature of the coil.

Scenario 602(3) includes multiple small rectangular-shaped tiles forming a series of gaps that approximate the curved shape of the coil 108. Each pair of the small tiles, which form some width of the strip 118(4), form a gap. For instance, tile 616 and tile 618 form a gap 620, while tile 622 and tile 624 form a gap 626. Also, tile 628 and tile 630 form a gap 632. Additional tiles can be used to form additional gaps to more closely approximate the curve of the coil 108. Further, the tiles can be shaped to create gaps in other directions, based on the curvature of the coil.

Scenario 602(4) includes a partially curved tile 634 and a tile 636 forming a curved gap 638. The curved gap 638 can approximate the curve of the coil 108 in any suitable way, and the curved gap 638 is not intended to be limited to an exact match of the curve of the coil 108. For example, the curved gap 638 can be elliptical, circular, or rectangular with rounded corners. Any suitable radius can be utilized such that the curved gap 638 is positioned in a location that reduces the peak magnetic flux proximate to the coil 108, e.g., on an opposing side of the coil 108 from the ferrite tiles.

Current techniques for manufacturing ferrite tiles generally create rectangular-shaped tiles. As technology continues to advance, however, the described shapes as well as other shapes may become more-easily manufacturable. The described tile arrangements are each set forth as examples, and therefore should not be limited to the arrangements as specifically shown. Additional tile arrangements are also contemplated, such as different combinations of the described arrangements.

Figure 7:
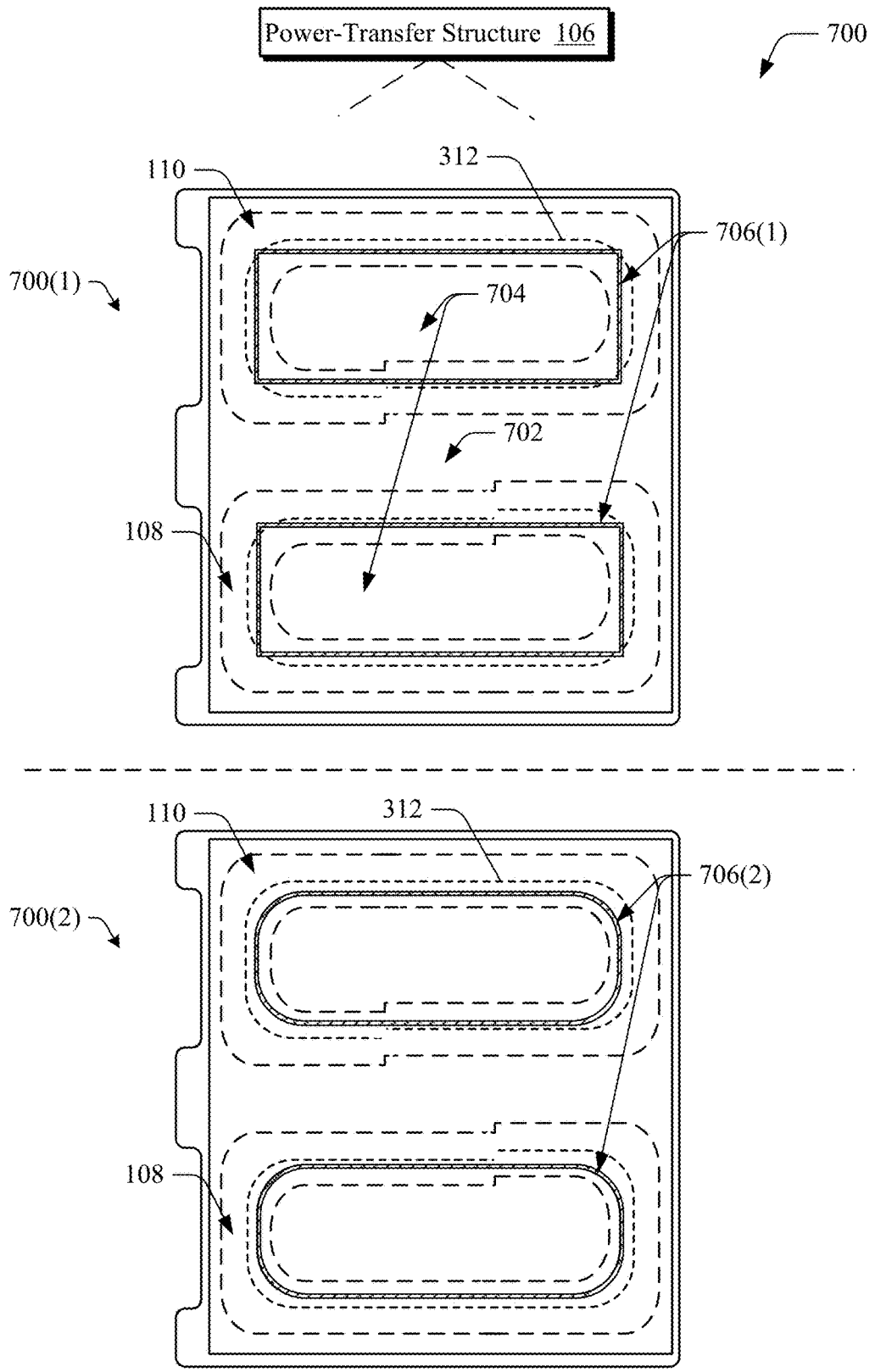
FIG. 7 illustrates an example implementation of a structure for reducing magnetic flux density proximate to a power-transfer structure.

FIG. 7 illustrates an example implementation 700 of the power-transfer structure 106 from FIG. 1. The example implementation 700 includes scenario 700(1) and scenario 700(2). In scenario 700(1), the ferrite layer includes a ferrite slab 702 with a hole under each coil 108, 110 and one or more ferrite pieces 704 disposed within each hole to form a gap 706(1) between the ferrite slab 702 and each ferrite piece 704. In example aspects, the ferrite pieces 704 can be cut out of the ferrite slab 702 or separately formed. The gap 706(1) for each coil 108, 110 includes a non-ferromagnetic portion (e.g., air or non-ferromagnetic material) that substantially approximates a smaller version of a shape of the midline 312 of a coil, such as the coil 108 or the coil 110. Scenario 700(2) includes an example implementation similar to that of scenario 700(1), but with a gap 706(2) having curved corners to more accurately approximate the shape of the coils 108, 110 or the shape of the midline 312 of the coils 108, 110.

Figure 8:
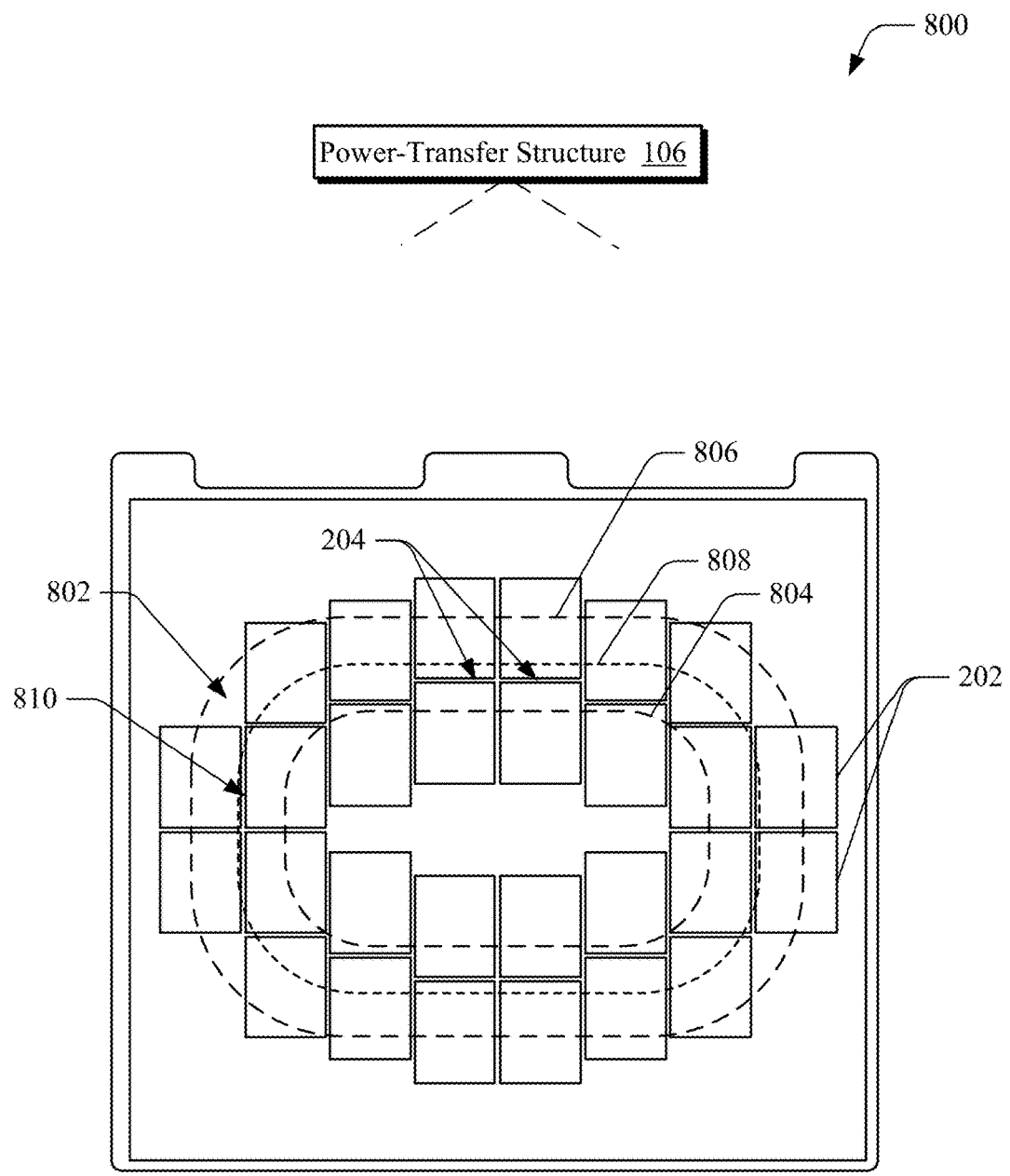
FIG. 8 illustrates an example implementation of a structure for reducing magnetic flux density proximate to a power-transfer structure.

FIG. 8 illustrates an example implementation 800 of the power-transfer structure 106 from FIG. 1. The power-transfer structure 106 includes a single circular coil 802, which can also be referred to as an elliptical coil. As illustrated, the circular coil 802 includes an inner edge 804, an outer edge 806, and a midline 808 centered between the inner edge 804 and the outer edge 806. In addition, the ferrite tiles 202 are arranged such that each pair of tiles is separated by a gap, such as gaps 204 or gap 810. Similar to the DD coil described above, the ferrite tiles 202 can be arranged such that at least some of the gaps (e.g., gaps 204, 810) between the ferrite tiles 202 approximate a smaller version of a shape of the midline 808 of the coil 802 or a smaller version of a shape of the coil 802 itself. Because of this, not all the gaps are uniform (e.g., in the same direction). Rather, some gaps, such as gap 810, are in a direction that is different from a direction of other gaps, such as gaps 204. In some instances, peak magnetic flux proximate to the coil 802 occurs in the area between the midline 808 and the inner edge 804. Accordingly, in one example, constructing the pad to have a predefined distance (e.g., gaps) between the ferrite tiles 202 in the area between the midline 808 and the inner edge 804 of the coil 802 reduced the peak magnetic flux proximate to the coil 802 by approximately 14%, when compared to a similar coil over a solid ferrite slab.

Figure 9:
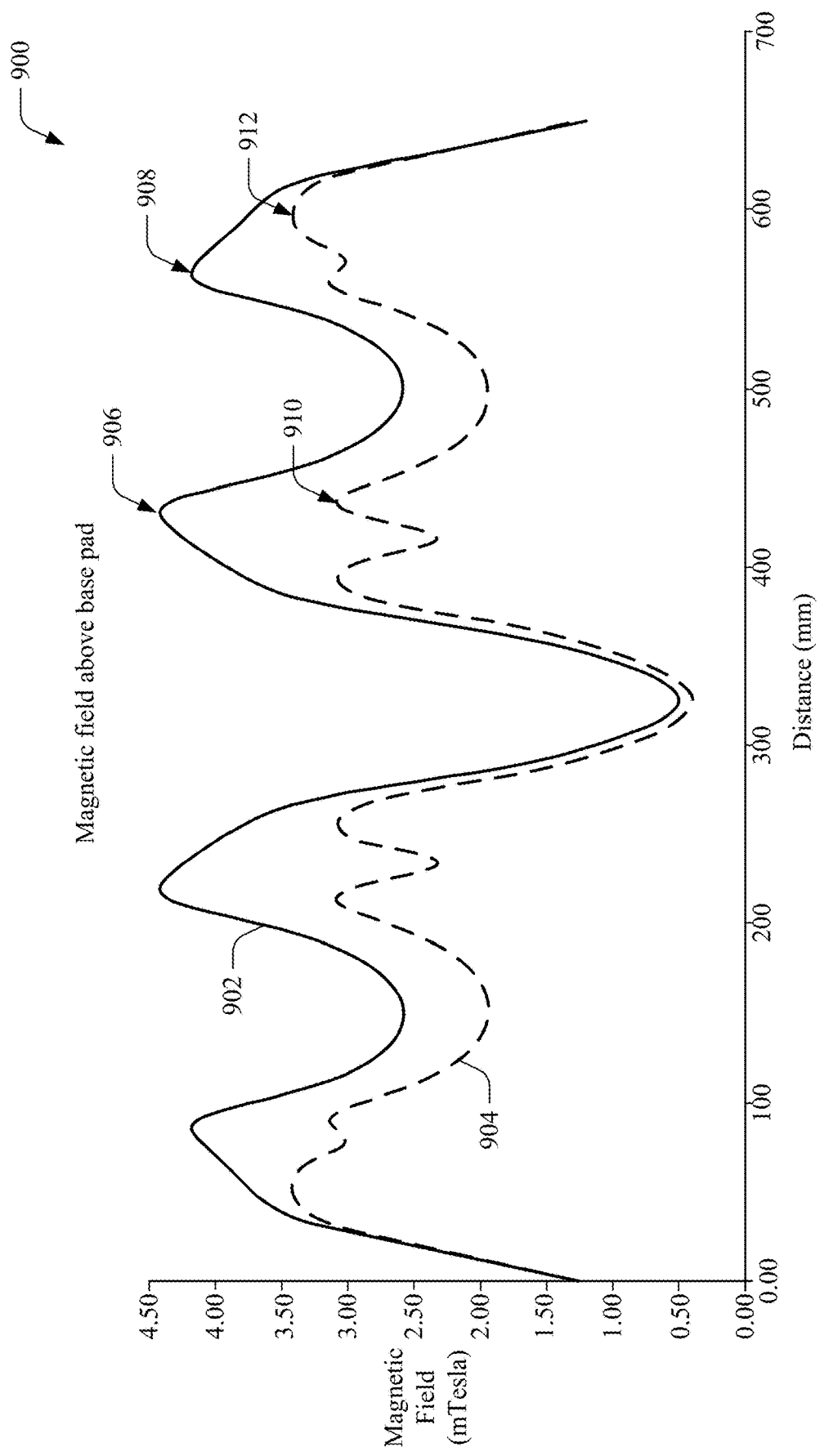
FIG. 9 illustrates a diagram representing a comparison between magnetic flux density above a power-transfer structure with gaps and magnetic flux density above a power-transfer structure without gaps.

FIG. 9 is a diagram 900 representing a comparison between magnetic flux density above a power-transfer structure with gaps and a magnetic flux density above a power-transfer structure without gaps. The diagram 900 represents a two-dimensional simulation of a magnetic field above a cross-section of a DD base pad (e.g., the DD pad from FIG. 3) from a first end (distance=0.00 mm) of the pad to a location beyond the outer edge of the pad (distance=700 mm) across two coils (e.g., portions 108(1), 108(2) of coil 108 and portions 110(1), 110(2) of coil 110 in FIG. 3). In the diagram 900, a solid line 902 represents a pad with zero gaps in the ferrite strips, and a dashed line 904 represents a pad with gaps in the ferrite strips positioned under each coil portion. The gaps located under the inner coil portions (e.g., portion 108(2) and portion 110(1)) are located at 90 mm from the center of the pad and have a width of 3.0 mm. The gaps located under the outer coil portions (e.g., portion 108(1) and portion 110(2)) are located at 250.32 mm from the center of the pad and have a width of 3.0 mm.

In the diagram 900, peak magnetic flux density 906 above the pad without gaps is approximately 4.41 milliTesla (mT) and is located directly above the inner coil portions. Additionally, peak magnetic flux density 908 over the outer coil portion of the pad without gaps is approximately 4.17 mT. In contrast, peak magnetic flux density 910 over the inner coil portion of the pad with gaps is 3.102 mT, and peak magnetic flux density 912 over the outer coil portion is 3.41 mT. Accordingly, in this example, overall peak magnetic flux density above the pad is reduced by approximately 22% by arranging the ferrite tiles to create gaps at the indicated locations. This also reduces the chances of heating a foreign metal object above a temperature limit, and therefore decreases the chances of harm to people or nearby materials.

Example Procedures

The following discussion describes example procedures for reducing peak magnetic flux density proximate to a charging pad, including a WEVC pad. The example procedures may be employed in the implementation 100 of FIG. 1, the system 1100 of FIG. 11, and/or any other suitable environment. The steps described for the various procedures can be implemented automatically and independent of user interaction. The orders in which operations of these procedures are shown and/or described are not intended to be construed as a limitation, and any number or combination of the described procedural operations can be combined in any order to implement a method, or an alternate method.

Figure 10:
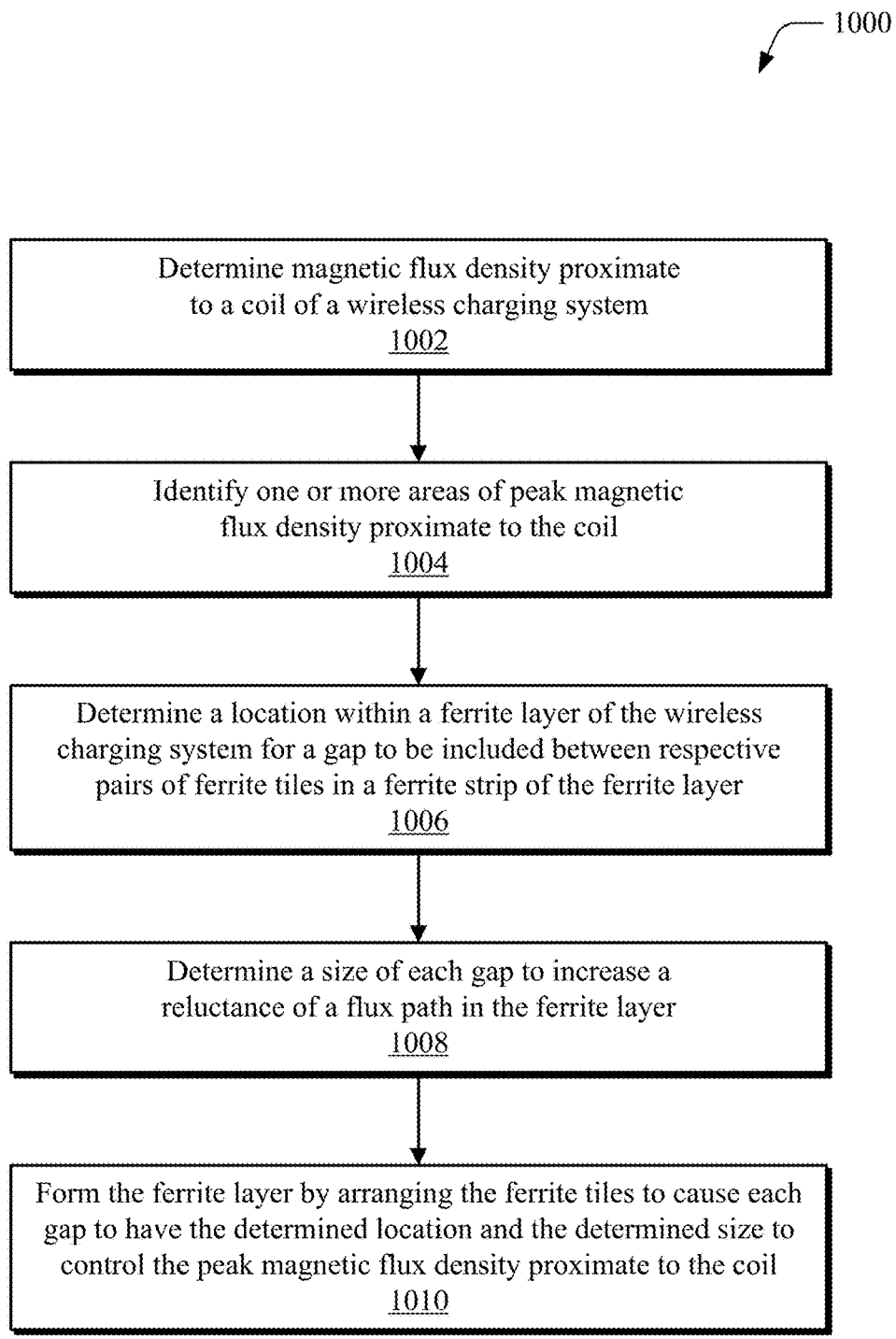
FIG. 10 depicts a flow diagram of an example process for reducing magnetic flux density proximate to a power-transfer structure, such as WEVC pad.

FIG. 10 depicts a flow diagram of an example process 1000 for controlling a peak magnetic flux density proximate to a coil of a wireless charging system, such as a WEVC pad for a vehicle. At 1002, magnetic flux density is determined proximate to a coil of a wireless charging system. In an example, the magnetic flux density above a base charging pad can be determined by simulation. In this way, a simulated magnetic flux density can be generated to identify potential high flux density zones that can cause hazardous conditions (e.g., high heat) in a foreign metal object.

At 1004, one or more areas of peak magnetic flux density are identified in the determined magnetic flux density. For example, in the simulation, areas having the highest relative flux density are identified as peak flux density zones that may be candidates for reduction in the flux density.

At 1006, respective locations within a ferrite layer of a wireless charging system are determined for a gap to be included between respective pairs of ferrite pieces (e.g., tiles) in a ferrite strip of the ferrite layer. In some aspects, a combination of gaps are aligned with a region that overlaps the coil between an inner edge of the coil and a midline of the coil.

At 1008, a size of each gap is determined to increase a reluctance of a flux path in the ferrite layer. For instance, the size of the gap can be predetermined based on factors such as coil placement or size, magnetic field strength generated by the coils, a number of rows of ferrite pieces included in the ferrite layer, a number of ferrite pieces included in each row of the ferrite layer, and so on.

At 1010, the ferrite layer is formed by arranging the ferrite pieces to cause each gap to have the determined location and the determined size to control a peak magnetic flux density proximate to the coil. In an example, the ferrite pieces are arranged in rows including at least an inner row and an outer row of three or more rows, and the outer row includes at least one additional gap in a direction that is different from a direction of a gap in the inner row.

Example Wireless Power Transfer System

An electric vehicle is used herein to describe a remote system, an example of which is a vehicle that includes, as part of its locomotion capabilities, electrical power derived from a chargeable energy storage device (e.g., one or more rechargeable electrochemical cells, capacitor, or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include trucks, motorcycles, carts, scooters, bicycles, and so forth. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 11:
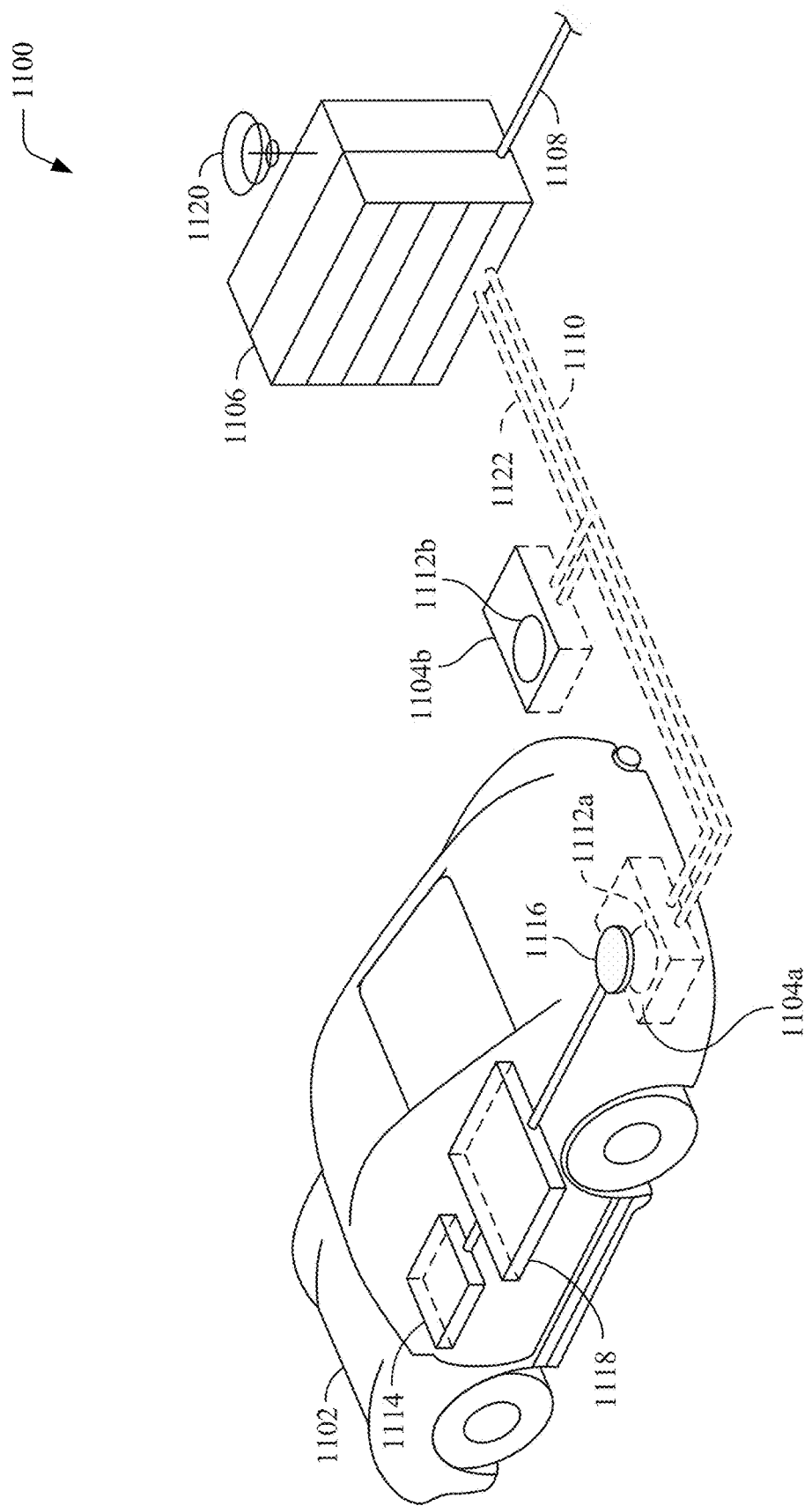
FIG. 11 is a diagram of an exemplary wireless power transfer system for charging an electric vehicle.

FIG. 11 is a diagram of an exemplary wireless power transfer system 1100 for charging an electric vehicle, in accordance with some exemplary implementations. The wireless power transfer system 1100 enables charging of an electric vehicle 1102 while the electric vehicle 1102 is stationary so as to efficiently couple with a base wireless charging system 1104a. Spaces for two electric vehicles are illustrated in a parking area to be parked over corresponding base wireless charging systems 1104a and 1104b. In some implementations, a local distribution center 1106 may be connected to a power backbone 1108 and configured to provide an alternating current (AC) or a direct current (DC) supply through a power link 1110 to the base wireless charging systems 1104a and 1104b. Each of the base wireless charging systems 1104a and 1104b also includes a base power-transfer structure 1112a and 1112b, respectively, for wirelessly transferring power. In some other implementations (not shown in FIG. 11), base power-transfer structures 1112a or 1112b may be stand-alone physical units and are not part of the base wireless charging system 1104a or 1104b. An example of base power-transfer structures 1112a or 1112b includes the power-transfer structure 106 as described with reference to FIGS. 1-8.

The electric vehicle 1102 may include a battery unit 1114, an electric vehicle power-transfer structure 1116, and an electric vehicle wireless charging system 1118. The electric vehicle wireless charging system 1118 and the electric vehicle power-transfer structure 1116 constitute the electric vehicle wireless charging system. In some diagrams shown herein, the electric vehicle wireless charging system 1118 is also referred to as a vehicle charging unit (VCU). The electric vehicle power-transfer structure 1116, such as the power-transfer structure 106, may interact with the base power-transfer structure 1112a, for example via a region of the electromagnetic field generated by the base power-transfer structure 1112a.

In some exemplary implementations, the electric vehicle power-transfer structure 1116 may receive power when the electric vehicle power-transfer structure 1116 is located in an electromagnetic field produced by the base power-transfer structure 1112a. The field may correspond to a region where energy output by the base power-transfer structure 1112a may be captured by the electric vehicle power-transfer structure 1116. For example, the energy output by the base power-transfer structure 1112a may be at a level sufficient to charge or power the electric vehicle 1102. In some cases, the field may correspond to a "near-field" of the base power-transfer structure 1112a. The near-field may correspond to a region in which there are strong reactive fields resulting from the currents and charges in the base power-transfer structure 1112a that do not radiate power away from the base power-transfer structure 1112a. In at least one example, the near-field may correspond to a region that is within about $\frac{1}{2\pi}$ of a wavelength of a frequency of the electromagnetic field produced by the base power-transfer structure 1112a distant from the base power-transfer structure 1112a, as will be further described below.

The electric vehicle power-transfer structure 1116 may be aligned with the base power-transfer structure 1112a and, therefore, disposed within a near-field region simply by the electric vehicle operator positioning the electric vehicle 1102 such that the electric vehicle power-transfer structure 1116 is sufficiently aligned relative to the base power-transfer structure 1112a. Alignment may be considered sufficient when an alignment error has fallen below a tolerable value. The operator may, however, be given visual and/or auditory feedback to determine when the electric vehicle 1102 is properly placed within a tolerance area for wireless power transfer. The electric vehicle 1102 may be positioned by an autopilot system, which moves the electric vehicle 1102 until the sufficient alignment is achieved. This may be performed automatically and autonomously by the electric vehicle 1102 with or without driver intervention. This may be possible for an electric vehicle 1102 that is equipped with a servo steering, radar sensors (e.g., ultrasonic sensors), and intelligence for safely maneuvering and adjusting the electric vehicle. The electric vehicle 1102 and/or the base wireless charging system 1104a may have functionality for mechanically displacing and moving the power-transfer structures 1116 and 1112a, respectively, relative to each other to more accurately orient or align them and develop sufficient and/or otherwise more efficient coupling there between.

The base wireless charging system 1104a may be located in a variety of locations. As non-limiting examples, some suitable locations include a parking area at a home of the electric vehicle 1102 owner, parking areas reserved for electric vehicle wireless charging modeled after conventional petroleum-based filling stations, stoplights, and other locations, such as shopping centers and places of employment, when a vehicle may be stationary for some period of time. Local distribution center 1106 may be configured to communicate with external sources (e.g., a power grid) via a communication backhaul 1120, and with the base wireless charging system 1104a via a communication link 1122.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 1100 as compared to a wired power transfer system. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 1102 may be used as distributed storage devices to stabilize a power grid, a convenient docking-to-grid solution may help to increase availability of vehicles for vehicle-to-grid (V2G) operation. The wireless power transfer system 1100 may also provide aesthetical and non-impedimental advantages. For example, there may be no charge columns or cables that may be impedimental for vehicles and/or pedestrians.

As a further explanation of the vehicle-to-grid capability, the wireless power transmit and receive capabilities may be configured to be reciprocal such that either the base wireless charging system 1104a can transmit power to the electric vehicle 1102 or the electric vehicle 1102 can transmit power to the base wireless charging system 1104a. This capability may be useful to stabilize the power distribution grid by allowing electric vehicles 1102 to contribute power to the overall distribution system in times of energy shortfall caused by over demand or shortfall in renewable energy production (e.g., wind or solar).

Figure 12:
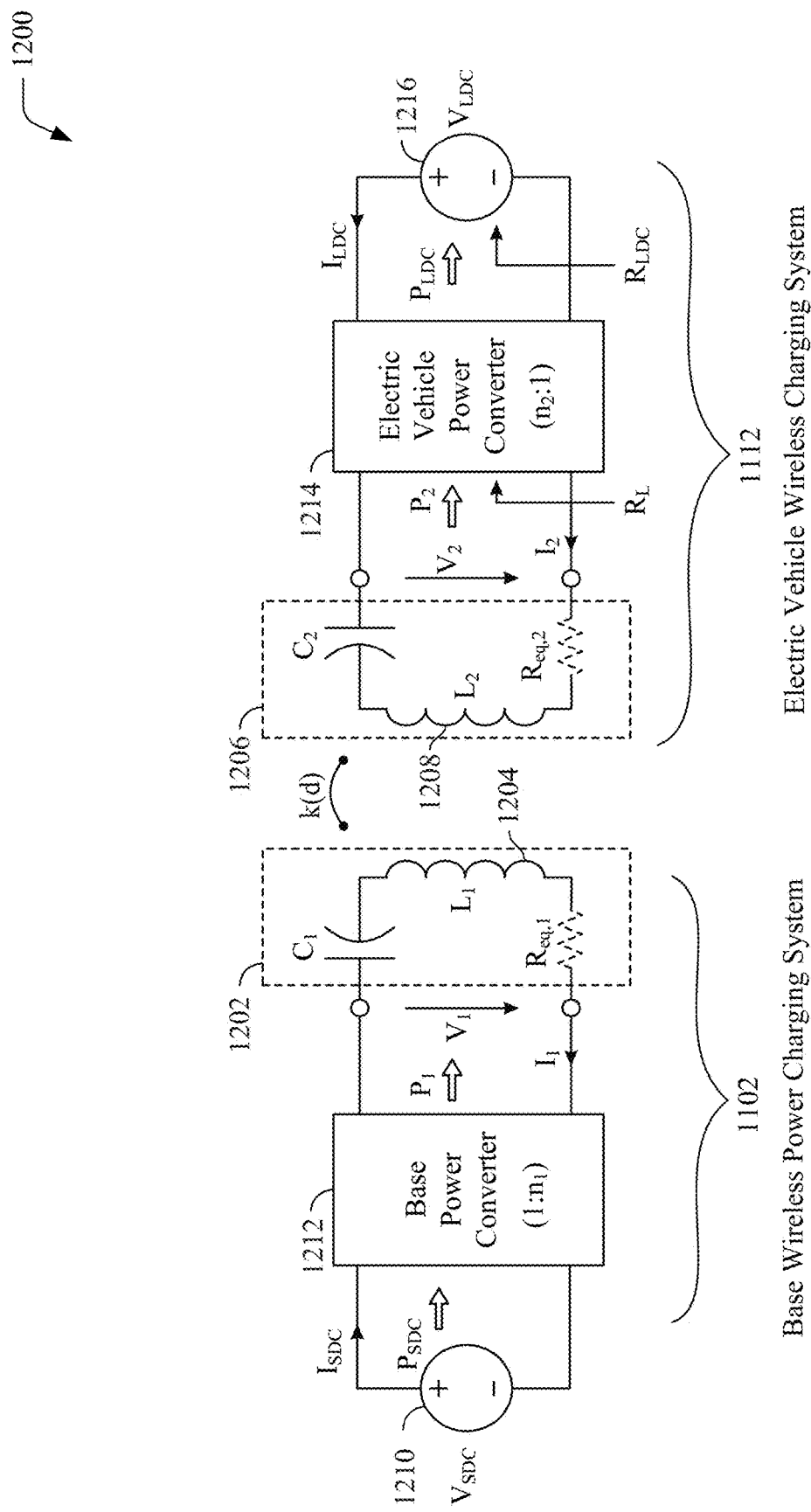
FIG. 12 is a schematic diagram of exemplary components of the wireless power transfer system of FIG. 11.

FIG. 12 is a schematic diagram of exemplary components of a wireless power transfer system 1200 similar to that previously discussed in connection with FIG. 11, in accordance with some exemplary implementations. The wireless power transfer system 1200 may include a base resonant circuit 1202 including a base power-transfer structure 1204, such as the power-transfer structure 106, having an inductance $L_1$. The wireless power transfer system 1200 further includes an electric vehicle resonant circuit 1206 including an electric vehicle power-transfer structure 1208, such as the power-transfer structure 106, having an inductance $L_2$. In aspects, capacitively loaded conductor loops (e.g., multi-turn coils—e.g., potentially using Litz wire) are used that form a resonant structure capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle power-transfer structure 1208 and the base power-transfer structure 1204. Using resonant structures for coupling energy may be referred to as "magnetically coupled resonance," "electromagnetically coupled resonance," and/or "resonant induction." The operation of the wireless power transfer system 1200 is described herein based on power transfer from the base power-transfer structure 1204 to the electric vehicle 1102 (not shown in FIG. 12), but is not limited thereto. For example, as discussed above, energy may also be transferred in the reverse direction.

With reference to FIG. 12, a power supply 1210 (e.g., AC or DC) supplies power $P_{SDC}$ to a base power converter 1212 as part of the base wireless power charging system 1104 to transfer energy to an electric vehicle (e.g., electric vehicle 1102 of FIG. 11). The base power converter 1212 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 1212 supplies power $P_1$ to the base resonant circuit 1202 including tuning capacitor $C_1$ in series with base power-transfer structure 1204 to emit an electromagnetic field at the operating frequency. In some aspects, the capacitor $C_1$ may be coupled with the base power-transfer structure 1204 in parallel. Tuning may, however, be formed of several reactive elements in any combination of parallel or series topology. The capacitor $C_1$ may be provided to form a resonant circuit with the base power-transfer structure 1204 that resonates substantially at the operating frequency. The base power-transfer structure 1204 receives the power $P_1$ and wirelessly transmits power at a level sufficient to charge or power the electric vehicle. For example, the level of power provided wirelessly by the base power-transfer structure 1204 may be on the order of kilowatts (kW) (e.g., anywhere from 1 kW to 110 kW, although actual levels may be or higher or lower).

The base resonant circuit 1202 (including the base power-transfer structure 1204 and tuning capacitor $C_1$) and the electric vehicle resonant circuit 1206 (including the electric vehicle power-transfer structure 1208 and tuning capacitor $C_2$) may be tuned to substantially the same frequency. The electric vehicle power-transfer structure 1208 may be positioned within the near-field of the base power-transfer structure and vice versa, as further explained below. In this case, the base power-transfer structure 1204 and the electric vehicle power-transfer structure 1208 may become coupled to one another such that power may be transferred wirelessly from the base power-transfer structure 1204 to the electric vehicle power-transfer structure 1208. The series capacitor $C_2$ may be provided to form a resonant circuit with the electric vehicle power-transfer structure 1208 that resonates substantially at the operating frequency. In some aspects, the capacitor $C_2$ may be coupled with the electric vehicle power-transfer structure 1208 in parallel. The electric vehicle resonant circuit 1206 may, however, be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the base and electric vehicle power-transfer structures 1204 and 1208 and the tuning (anti-reactance) capacitors $C_1$ and $C_2$, respectively. The electric vehicle resonant circuit 1206, including the electric vehicle power-transfer structure 1208 and capacitor $C_2$, receives the power $P_2$ and provides the power $P_2$ to an electric vehicle power converter 1214 of the electric vehicle wireless charging system 1118.

The electric vehicle power converter 1214 may include, among other things, a LF-to-DC converter configured to convert power at an operating frequency back to DC power at a voltage level of a load 1216 that may represent the electric vehicle battery unit. The electric vehicle power converter 1214 may provide the converted power $P_{LDC}$ to the load 1216. The power supply 1210, base power converter 1212, and base power-transfer structure 1204 may be stationary and located at a variety of locations as discussed above. The load 1216 (e.g., the electric vehicle battery unit), electric vehicle power converter 1214, and electric vehicle power-transfer structure 1208 may be included in the electric vehicle wireless charging system 1118 that is part of the electric vehicle (e.g., electric vehicle 1102) or part of its battery pack (not shown). The electric vehicle wireless charging system 1118 may also be configured to provide power wirelessly through the electric vehicle power-transfer structure 1208 to the base wireless power charging system 1104 to feed power back to the grid or other power supply 1210. Each of the electric vehicle power-transfer structure 1208 and the base power-transfer structure 1204 may act as transmit or receive power-transfer structures based on the mode of operation.

Although not shown, the wireless power transfer system 1200 may include a load disconnect unit (LDU) to safely disconnect the electric vehicle load 1216 or the power supply 1210 from the wireless power transfer system 1200. For example, in case of an emergency or system failure, the LDU may be triggered to disconnect the load from the wireless power transfer system 1200. The LDU may be provided in addition to a battery management system for managing charging of a battery, or the LDU may be part of the battery management system.

Further, the electric vehicle wireless charging system 1118 may include switching circuitry (not shown) for selectively connecting and disconnecting the electric vehicle power-transfer structure 1208 to the electric vehicle power converter 1214. Disconnecting the electric vehicle power-transfer structure 1208 may suspend charging and also may change the "load" as "seen" by the base wireless power charging system 1104 (acting as a transmitter), which may be used to "cloak" the electric vehicle wireless charging system 1118 (acting as the receiver) from the base wireless charging system 1104. The load changes may be detected if the transmitter includes a load sensing circuit. Accordingly, the transmitter, such as the base wireless charging system 1104, may have a mechanism for determining when receivers, such as the electric vehicle wireless charging system 1118, are present in the near-field coupling mode region of the base power-transfer structure 1204 as further explained below.

As described above, during energy transfer towards an electric vehicle (e.g., electric vehicle 1102 of FIG. 11), input power is provided from the power supply 1210 such that the base power-transfer structure 1204 generates an electromagnetic field for providing the energy transfer. The electric vehicle power-transfer structure 1208 couples to the electromagnetic field and generates output power for storage or consumption by the electric vehicle 1102. In some aspects, the base resonant circuit 1202 and electric vehicle resonant circuit 1206 are configured and tuned according to a mutual resonant relationship such that they are resonating nearly or substantially at the operating frequency. Transmission losses between the base wireless power charging system 1104 and electric vehicle wireless charging system 1118 are minimal when the electric vehicle power-transfer structure 1208 is located in the near-field coupling mode region of the base power-transfer structure 1204 as further explained below.

As stated, an efficient energy transfer occurs by transferring energy via a magnetic near-field rather than via electromagnetic waves in the far-field, which may involve substantial losses due to radiation into the space. When in the near-field, a coupling mode may be established between the transmit power-transfer structure and the receive power-transfer structure. The space around the power-transfer structures where this near-field coupling may occur is referred to herein as a near-field coupling mode region.

While not shown, the base power converter 1212 and the electric vehicle power converter 1214 if bidirectional may both include, for a transmit mode, an oscillator, a driver circuit such as a power amplifier, a filter and matching circuit, and for a receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 1202 and 1206 to the base and electric vehicle power converters 1212 and 1214, respectively. For the receive mode, the base and electric vehicle power converters 1212 and 1214 may also include a rectifier and switching circuitry.

The electric vehicle power-transfer structure 1208 and the base power-transfer structure 1204 as described throughout the disclosed implementations may be referred to or configured as "conductor loops," and more specifically, as "multi-turn conductor loops" or coils (e.g., potentially implemented as Litz wire wound to have multiple turns). The base and electric vehicle power-transfer structures 1204 and 1208 may also be referred to herein or be configured as "magnetic" power-transfer structures. The term "power-transfer structure" is intended to refer to a component that may wirelessly output or receive energy for coupling to another "power-transfer structure."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 1202) including a power-transfer structure (e.g., the base power-transfer structure 1204 and capacitor $C_2$) as described above. As shown in FIG. 12, inductance may generally be the inductance of the power-transfer structure, whereas, capacitance may be added to the power-transfer structure to create a resonant structure at a desired resonant frequency. Accordingly, for larger size power-transfer structures using larger diameter coils exhibiting larger inductance, the value of capacitance needed to produce resonance may be lower. Inductance may also depend on a number of turns of a coil. Furthermore, as the size of the power-transfer structure increases, coupling efficiency may increase. This is mainly true if the size of both base and electric vehicle power-transfer structures increase. Furthermore, a resonant circuit including a power-transfer structure and tuning capacitor may be designed to have a high quality (Q) factor to improve energy transfer efficiency. For example, the Q factor may be 300 or greater.

As described above, the near-field may correspond to a region around the power-transfer structure in which mainly reactive electromagnetic fields exist. If the physical size of the power-transfer structure is much smaller than the wavelength, inversely proportional to the frequency, there is no substantial loss of power due to waves propagating or radiating away from the power-transfer structure. Near-field coupling-mode regions may correspond to a volume that is near the physical volume of the power-transfer structure, typically within a small fraction of the wavelength. According to some aspects, magnetic power-transfer structures, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" power-transfer structures (e.g., dipoles and monopoles) or a combination of magnetic and electric power-transfer structures may be used.

Figure 13:
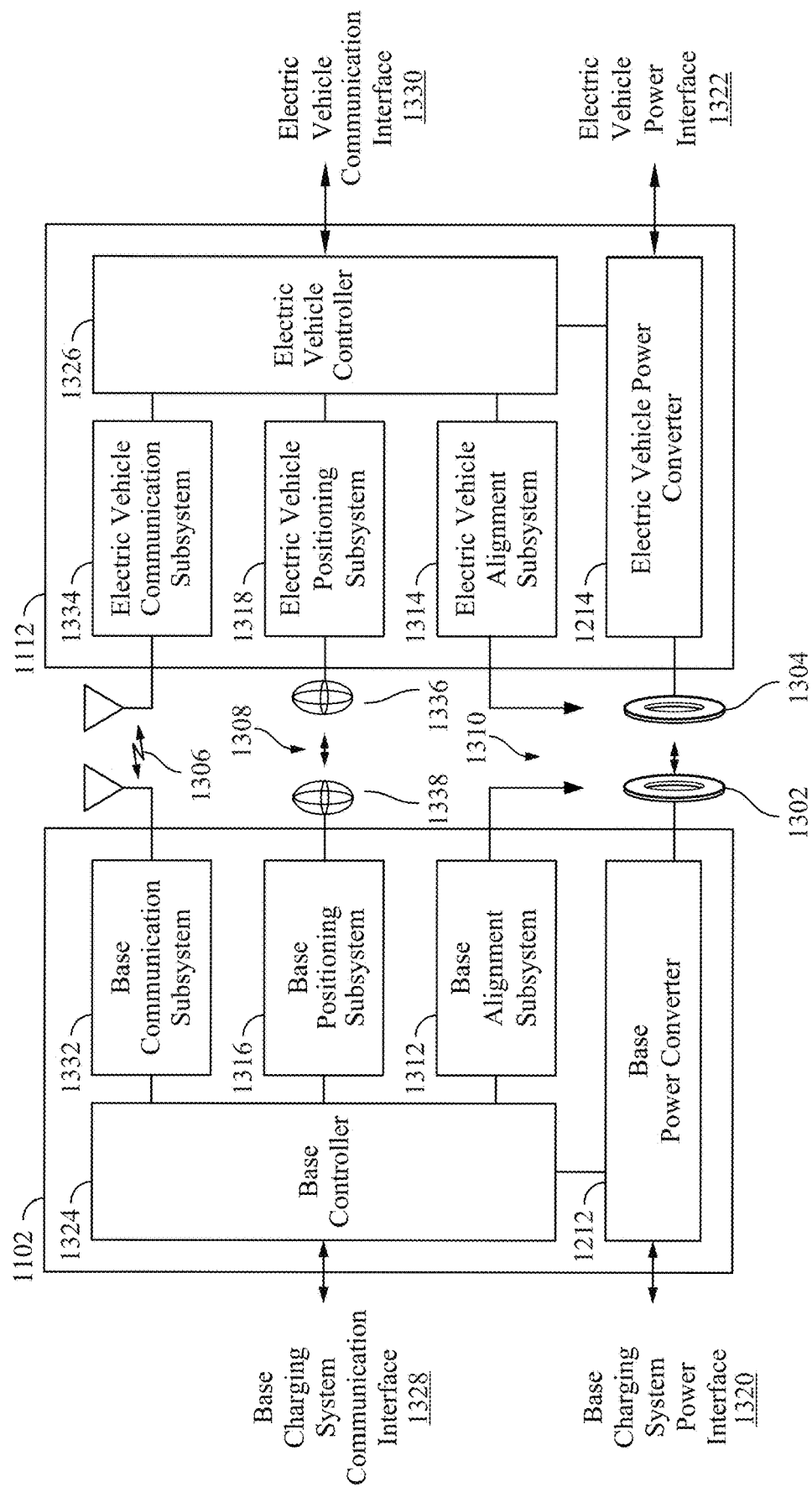
FIG. 13 is a functional block diagram showing exemplary components of the wireless power transfer system of FIG. 11.

FIG. 13 is a functional block diagram showing exemplary components of wireless power transfer system 1300, which may be employed in the wireless power transfer system 1100 of FIG. 11 and/or that the wireless power transfer system 1200 of FIG. 12 may be a part of. The wireless power transfer system 1300 illustrates a base power-transfer structure 1302 and an electric vehicle power-transfer structure 1304. In addition, the wireless power transfer system 1300 includes a communication link 1306; a positioning link 1308, using, for example, a magnetic field signal for determining a position or direction; and an alignment mechanism 1310 capable of mechanically moving one or both of the base power-transfer structure 1302 and the electric vehicle power-transfer structure 1304. An example of the base power-transfer structure 1302 and/or the electric vehicle power-transfer structure 1304 is the power-transfer structure 106 described above with reference to FIGS. 1-8 and 11. Mechanical (kinematic) alignment of the base power-transfer structure 1302 and the electric vehicle power-transfer structure 1304 may be controlled by a base alignment subsystem 1312 and an electric vehicle alignment subsystem 1314, respectively. The positioning link 1308 may be capable of bi-directional signaling, meaning that positioning signals may be emitted by a base positioning subsystem 1316 or an electric vehicle positioning subsystem 1318, or by both.

As described above with reference to FIG. 11, when energy flows towards the electric vehicle 1102, in FIG. 13 a base charging system power interface 1320 may be configured to provide power to a base power converter 1212 from a power source, such as an AC or DC power supply (not shown). The base power converter 1212 may receive AC or DC power via the base charging system power interface 1320 to drive the base power-transfer structure 1302 at a frequency near or at the resonant frequency of the base resonant circuit 1202 with reference to FIG. 12. The electric vehicle power-transfer structure 1304, when in the near-field coupling-mode region, may receive energy from the electromagnetic field to oscillate at or near the resonant frequency of the electric vehicle resonant circuit 1206 with reference to FIG. 12. The electric vehicle power converter 1214 converts the oscillating signal from the electric vehicle power-transfer structure 1304 to a power signal suitable for charging a battery via an electric vehicle power interface 1322.

The base wireless charging system 1104 includes a base controller 1324, and the electric vehicle wireless charging system 1118 includes an electric vehicle controller 1326. The base controller 1324 may provide a base charging system communication interface 1328 to other systems (not shown) such as, for example, a computer, a base common communication (BCC), a communications entity of the power distribution center, or a communications entity of a smart power grid. The electric vehicle controller 1326 may provide an electric vehicle communication interface 1330 to other systems (not shown) such as, for example, an on-board computer on the vehicle, a battery management system, other systems within the vehicle, and remote systems.

The wireless power transfer system 1300 is illustrated as including a base communication subsystem 1332 and an electric vehicle communication subsystem 1334 that may include subsystems or modules for specific application with separate communication channels and also for wirelessly communicating with other communications entities not shown in the diagram of FIG. 13. These communications channels may be separate physical channels or separate logical channels. As non-limiting examples, the base alignment subsystem 1312 may communicate with the electric vehicle alignment subsystem 1314 through the communication link 1306 to provide a feedback mechanism for more closely aligning the base power-transfer structure 1302 and the electric vehicle power-transfer structure 1304, for example via autonomous mechanical (kinematic) alignment, by either the electric vehicle alignment subsystem 1314 or the base alignment subsystem 1312, or by both, or with operator assistance as described herein.

The electric vehicle wireless charging system 1118 may further include the electric vehicle positioning subsystem 1318 connected to a magnetic field generator 1336. The electric vehicle positioning subsystem 1318 may be configured to drive the magnetic field generator 1336 with currents that generate an alternating magnetic field. The base wireless charging system 1104 may include a magnetic field sensor 1338 connected to a base positioning subsystem 1316. The magnetic field sensor 1338 may be configured to generate a plurality of voltage signals under influence of the alternating magnetic field generated by the magnetic field generator 1336. The base positioning subsystem 1316 may be configured to receive these voltage signals and output a signal indicative of a position estimate and an angle estimate between the magnetic field sensor 1338 and the magnetic field generator 1336. These position and angle estimates may be translated into visual and/or acoustic guidance and alignment information that a driver of the electric vehicle may use to reliably park the vehicle. In some implementations, these position and angle estimates may be used to park a vehicle automatically with no or only minimal driver intervention (drive by wire).

In some implementations, the positioning error (error in the position estimates) at offsets (distances)<20 cm may be specified to <2 cm, and for distances >20 cm to <1% of distance, e.g., <10 cm at a distance of 1 m and <50 cm at a distance of 5 m, where the distance refers to the horizontal distance between the magnetic centers of the magnetic field generator 1336 and the magnetic field sensor 1338. The positioning error may refer to the error magnitude (error radius) and, e.g., to the $90^{th}$ percentile of position error statistics. Accordingly, the orientation error (error in the angle estimate) at distances <20 cm may be specified to <2°, and for distances >20 cm to <5°.

Further, the electric vehicle controller 1326 may be configured to communicate with electric vehicle onboard systems. For example, the electric vehicle controller 1326 may provide, via the electric vehicle communication interface 1330, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle power-transfer structures 1302 and 1304. Moreover, electric vehicle controller 1326 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 1300 may also support plug-in charging via a wired connection, for example, by providing a wired charge port (not shown) at the electric vehicle wireless charging system 1118. The electric vehicle wireless charging system 1118 may integrate the outputs of the two different chargers prior to transferring power to or from the electric vehicle. Switching circuits may provide the functionality as needed to support both wireless charging and charging via a wired charge port.

To communicate between the base wireless charging system 1104 and the electric vehicle wireless charging system 1118, the wireless power transfer system 1300 may use in-band signaling via base and electric vehicle power-transfer structures 1302, 1304 and/or out-of-band signaling via communications systems (subsystems 1332, 1334), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle power-transfer structures 1304 and 1308 may also be configured to act as wireless communication antennas. Thus, some implementations of the base wireless charging system 1104 may include a controller (not shown) for enabling keying type protocol on the wireless power path. By keying the transmit power level (amplitude shift keying) at predefined intervals with a predefined protocol, the receiver may detect a serial communication from the transmitter. The base power converter 1212 may include a load sensing circuit (not shown) for detecting the presence or absence of active electric vehicle power receivers in the near-field coupling mode region of the base power-transfer structure 1302. By way of example, a load sensing circuit monitors the current flowing to a power amplifier of the base power converter 1212, which is affected by the presence or absence of active power receivers in the near-field coupling mode region of the base power-transfer structure 1302. Detection of changes to the loading on the power amplifier may be monitored by the base controller 1324 for use in determining whether to enable the base wireless charging system 1104 for transmitting energy, to communicate with a receiver, or a combination thereof.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A wireless charging apparatus comprising:
   a coil configured to generate a magnetic field, the coil having windings wound to form a coil layer with a substantially concentric opening; and
   a plurality of ferrite tiles including at least a first pair of tiles and a second pair of tiles each located proximate to the coil, the plurality of ferrite tiles forming a ferrite layer that overlaps the coil layer such that the ferrite layer is orthogonal to a portion of the magnetic field that passes through the opening, the plurality of ferrite tiles configured to provide a path for magnetic flux of the magnetic field, the first pair of tiles separated by a first gap having a predefined size to increase a magnetic reluctance of the path of the magnetic flux through the first pair of tiles, the second pair of tiles separated by a second gap having a predefined size to increase a magnetic reluctance of the path of the magnetic flux through the second pair of tiles, the first gap and the second gap each located under the windings of the coil at a respective location that is between an inner edge of the coil and a midline of the coil, the first gap running in a first direction that is different from a second direction of the second gap, the first pair of tiles arranged to cause the first gap to be substantially parallel with the windings of the coil under which the first gap is located, the second pair of tiles arranged to cause the second gap to substantially approximate a shape of an outer curve of the coil under which the second gap is located, the first and second gaps forming a combination of gaps that are aligned with the windings of the coil and that approximate a curvature of a shape of the coil, the combination of gaps configured to reduce a peak magnetic flux density in proximity to the coil based on location and size of the gaps in the combination of gaps.

2. The wireless charging apparatus as described in claim 1, wherein the first pair of tiles is arranged to cause the first gap to be substantially orthogonal to a direction of the magnetic field.

3. The wireless charging apparatus as described in claim 1, wherein the predefined size of the first gap is larger than manufacturing tolerances of each tile of the first pair of tiles.

4. The wireless charging apparatus as described in claim 1, wherein the plurality of ferrite tiles includes a subset of tiles positioned along a longitudinal axis that is substantially parallel to a direction of the magnetic field.

5. The wireless charging apparatus as described in claim 1, wherein the peak magnetic flux density in proximity to the coil is in air proximate to the coil on a side of the coil that is opposite the plurality of ferrite tiles.

6. The wireless charging apparatus as described in claim 1, wherein:
   the plurality of ferrite tiles are arranged in rows including at least an inner row and an outer row;
   the inner row includes the first pair of tiles separated by the first gap;
   the outer row includes the second pair of tiles separated by the second gap; and
   a combination of the second pair of tiles with the second gap forms a width of the outer row.

7. The wireless charging apparatus as described in claim 1, further comprising an additional coil that is adjacent and co-planar with the coil, wherein the plurality of ferrite tiles are separated by gaps disposed along the coil and the additional coil.

8. The wireless charging apparatus as described in claim 1, wherein the second pair of tiles are arranged to form the second gap to be angled along the outer curve of the coil relative to a direction of the first gap.

9. The wireless charging apparatus as described in claim 1, wherein the second pair of tiles are arranged to form the second gap as a curved gap that approximates the outer curve of the coil.

10. The wireless charging apparatus as described in claim 1, wherein the first gap runs in a first direction that is substantially orthogonal to a second direction of the second gap.

11. The wireless charging apparatus as described in claim 1, wherein the second pair of tiles forms the second gap in multiple segments with neighboring segments forming an angle between 90 degrees and 180 degrees to approximate the curvature of the coil.

12. A wireless charging system comprising:
   a coil configured to generate a magnetic field based on an electrical current running through the coil, the coil having windings that are wound to form a coil layer with a substantially concentric opening, the coil having an inner edge, an outer edge, and a midline centered between the inner edge and the outer edge, the inner edge aligned with the opening and located between the opening and the midline; and a ferromagnetic layer configured to provide a path for magnetic flux of the magnetic field, the ferromagnetic layer located under the coil layer and being orthogonal to a portion of the magnetic field that passes through the opening, the ferromagnetic layer including a non-ferromagnetic portion that:

is disposed at a location within the ferromagnetic layer that is under the windings of the coil and between the midline and the inner edge of the coil;

is substantially parallel with the windings under which the non-ferromagnetic portion is located;

approximates a curvature of an outer curve of the coil under which the non-ferromagnetic portion is located; and is configured to increase a magnetic reluctance of the path of the magnetic flux through the ferromagnetic layer and reduce a peak magnetic flux density in proximity to the coil.

13. The wireless charging system as described in claim 12, wherein the ferromagnetic layer comprises a plurality of ferrite tiles arranged in rows each having a longitudinal axis that is substantially parallel to a direction of the magnetic field.

14. The wireless charging system as described in claim 13, wherein each row includes a non-ferromagnetic portion disposed between a pair of tiles of the plurality of ferrite tiles such that the non-ferromagnetic portion of each row is orthogonal to the direction of the magnetic field.

15. The wireless charging system as described in claim 12, wherein:

the ferromagnetic layer includes a first ferrite portion and a second ferrite portion;

the first ferrite portion is separated from the second ferrite portion by the non-ferromagnetic portion; and the non-ferromagnetic portion substantially approximates a smaller version of a portion of a shape of the midline of the coil.

16. The wireless charging system as described in claim 12, wherein the ferromagnetic layer is disposed on a first side of the coil and is configured to reduce the peak magnetic flux density on a second side of the coil that is opposite the first side.

17. The wireless charging system as described in claim 12, wherein:

the ferromagnetic layer includes a plurality of ferrite tiles arranged in rows including an inner row and an outer row;

the inner row includes a pair of adjacent ferrite tiles of the plurality of ferrite tiles that are separated by a gap;

the outer row includes a subset of tiles of the plurality of ferrite tiles arranged to create an additional gap under the outer curve of the coil and in a first direction that is different from a second direction corresponding to the gap in the inner row; and the non-ferromagnetic portion is positioned within the additional gap.

18. The wireless charging system as described in claim 12, wherein the non-ferromagnetic portion has a predetermined size that controls the magnetic reluctance of the magnetic flux across the ferromagnetic layer.

19. The wireless charging system as described in claim 18, wherein the predetermined size of the non-ferromagnetic portion is in a range of 0.25 millimeters to one centimeter.

20. The wireless charging system as described in claim 12, wherein:

the coil includes a first coil and the wireless charging system further comprises a second coil that is co-planar with the first coil;

the second coil is configured to run current in a direction opposite to a direction of current in the first coil; and the ferromagnetic layer includes an additional non-ferromagnetic portion disposed at another location within the ferromagnetic layer that overlaps the second coil.

21. The wireless charging system as described in claim 12, wherein a shape of the coil is one of circular, elliptical, or rectangular with rounded corners.

22. A method for controlling a peak magnetic flux density proximate to a coil of a wireless charging system, the method comprising:

determining respective locations within a ferrite layer of the wireless charging system for a gap to be included between respective pairs of ferrite tiles of the ferrite layer, a combination of gaps being aligned with a region that overlaps windings of the coil between an inner edge of the coil and a midline centered between the inner edge and an outer edge of the coil, a respective gap of the combination of gaps being substantially parallel to a relative direction of the windings of the coil under which the respective gap is located, at least one gap of the combination of gaps determined to approximate a curvature of the windings of the coil in an outer curve of the coil under which the at least one gap is located, the windings of the coil being wound to form a coil layer having a substantially concentric opening, the inner edge of the coil aligned with the opening, the coil layer stacked with the ferrite layer such that the ferrite layer is orthogonal to a magnetic field passing through the opening;

determining a size of each gap to increase a magnetic reluctance of a flux path in the ferrite layer; and forming the ferrite layer by arranging the ferrite tiles to cause each gap to have the determined location and the determined size to control the peak magnetic flux density proximate to the coil.

23. The method as described in claim 22, wherein the peak magnetic flux density proximate to the coil is reduced based on the determined location and the determined size of each gap to control the magnetic reluctance of the flux path in the ferrite layer.

24. The method as described in claim 22, wherein a subset of the ferrite tiles is arranged in a row including a longitudinal axis substantially parallel to a direction of a magnetic field generated by the coil, wherein the row includes a pair of ferrite tiles arranged to form a gap between the pair of ferrite tiles.

25. The method as described in claim 22, wherein:

the ferrite tiles are arranged in rows including at least an inner row and an outer row;

the inner row includes one or more gaps of the combination of gaps;

the outer row includes the at least one gap positioned under the outer curve of the coil; and the at least one gap having a first direction that is substantially perpendicular to a second direction corresponding to the one or more gaps in the inner row.

26. The method as described in claim 22, wherein the size of each gap is in a range of 0.25 millimeters to one centimeter.

27. A wireless power-transfer apparatus comprising:
a coil configured to generate a magnetic field based on an electrical current running through the coil, the coil having windings that are wound to form a coil layer with a substantially concentric opening, an inner edge, an outer edge, and a midline centered between the inner edge and the outer edge, the inner edge forming the opening in the coil, the inner edge located between the opening and the midline; and
a channeling means for channeling magnetic flux induced by the magnetic field and controlling a peak magnetic flux density proximate to the coil based on an increased reluctance of a path of the magnetic flux through a ferrite layer at a predetermined location overlapping the windings of the coil, the coil layer located on top of the ferrite layer such that the ferrite layer is orthogonal to a portion of the magnetic field that passes through the opening, the predetermined location of the increased reluctance:
approximating a curvature of an outer curve of the coil along a region that is between the inner edge and the midline of the coil; and
being substantially aligned with a relative direction of the windings of the coil at a corresponding location of the predetermined location overlapping the windings of the coil.

28. The wireless power-transfer apparatus as described in claim 27, wherein:
the ferrite layer is disposed on a first side of the coil; and
the channeling means is configured to reduce the peak magnetic flux density on a second side of the coil that is opposite the first side based on an arrangement of ferrite tiles that form gaps in the ferrite layer that increase the reluctance of the path of the magnetic flux.

29. The wireless power-transfer apparatus as described in claim 27, wherein:
the ferrite layer comprises a plurality of ferrite tiles arranged in rows; and
each row includes at least one gap that is orthogonal to the magnetic field.

30. The wireless power-transfer apparatus as described in claim 27, wherein:
the ferrite layer comprises a plurality of ferrite tiles arranged in rows including at least an inner row and an outer row that is substantially parallel to the inner row;
the plurality of ferrite tiles includes a first pair of ferrite tiles and a second pair of ferrite tiles;
the inner row includes the first pair of ferrite tiles separated by a gap that is substantially perpendicular to a first longitudinal axis of the inner row and that is located at a first predetermined location of the increased reluctance; and
the outer row includes the second pair of ferrite tiles separated by an additional gap that is substantially parallel to a second longitudinal axis of the outer row and that is located at a second predetermined location of the increased reluctance.

\* \* \* \* \*